(12) United States Patent
Varshney et al.

(10) Patent No.: US 8,793,117 B1
(45) Date of Patent: Jul. 29, 2014

(54) SYSTEM AND METHOD FOR VIRTUALIZATION OF NETWORKING SYSTEM SOFTWARE VIA EMULATION

(75) Inventors: Maneesh Varshney, Los Angeles, CA (US); Rajive Bagrodia, Los Angeles, CA (US); Sheetalkumar Doshi, Los Angeles, CA (US)

(73) Assignee: Scalable Network Technologies, Inc., Culver City, CA (US)

( * ) Notice: Subject to any disclaimer, the term of this patent is extended or adjusted under 35 U.S.C. 154(b) by 825 days.

(21) Appl. No.: 12/205,276

(22) Filed: Sep. 5, 2008

Related U.S. Application Data

(60) Provisional application No. 61/045,520, filed on Apr. 16, 2008.

(51) Int. Cl.
*G06F 9/455* (2006.01)
*H04L 29/06* (2006.01)
*G06F 3/06* (2006.01)

(52) U.S. Cl.
CPC ............. *H04L 69/18* (2013.01); *G06F 3/0664* (2013.01); *G06F 9/45533* (2013.01)
USPC ................... 703/21; 718/1; 719/319; 709/230

(58) Field of Classification Search
USPC ............ 703/23, 25; 719/328, 329; 726/3, 15; 710/105; 709/230
See application file for complete search history.

(56) References Cited

U.S. PATENT DOCUMENTS

| | | | | |
|---|---|---|---|---|
| 5,325,361 A * | 6/1994 | Lederer et al. | ................ | 370/401 |
| 5,448,566 A * | 9/1995 | Richter et al. | ................ | 370/431 |
| 5,721,876 A * | 2/1998 | Yu et al. | ........................... | 703/27 |
| 5,732,213 A * | 3/1998 | Gessel et al. | .................. | 709/224 |
| 5,774,695 A * | 6/1998 | Autrey et al. | ................... | 703/26 |
| 5,889,954 A * | 3/1999 | Gessel et al. | ................... | 709/223 |
| 6,069,894 A * | 5/2000 | Holender et al. | ............ | 370/397 |
| 6,256,322 B1 * | 7/2001 | Wilson, Jr. | .................... | 370/469 |
| 6,442,612 B1 * | 8/2002 | Hugosson et al. | ........... | 709/230 |
| 6,687,762 B1 * | 2/2004 | Van Gaasbeck et al. | ..... | 719/319 |
| 6,728,249 B2 * | 4/2004 | Chang | ........................ | 370/395.3 |
| 6,757,731 B1 * | 6/2004 | Barnes et al. | ................. | 709/227 |
| 7,146,537 B2 * | 12/2006 | Kolbe | ............................. | 714/28 |
| 7,328,144 B1 * | 2/2008 | Grier et al. | ...................... | 703/22 |
| 7,415,513 B2 * | 8/2008 | Connor et al. | ................. | 709/220 |
| 7,472,052 B2 * | 12/2008 | Foreman et al. | ................ | 703/21 |
| 7,496,095 B1 * | 2/2009 | Davis | ........................... | 370/392 |
| 7,656,815 B2 * | 2/2010 | Kellerer et al. | ............... | 370/252 |
| 7,689,987 B2 * | 3/2010 | Neil | ................................ | 718/1 |
| 7,822,065 B2 * | 10/2010 | Lu | ................................ | 370/469 |

(Continued)

*Primary Examiner* — Omar Fernandez Rivas
*Assistant Examiner* — Kibrom Gebresilassie
(74) *Attorney, Agent, or Firm* — Irell & Manella LLP

(57) ABSTRACT

A network application may be run on a host computer using a target protocol stack by launching a network application on the host computer, opening a target protocol stack library on the host computer before opening a host computer system library and using the target protocol stack library to divert interface calls associated with the network application to a target protocol stack, whereby the network application runs on the host computer as if it were running directly on a computer on which the target protocol stack is available. A network environment may be simulated including wireless communication between a plurality of mobile devices. Multiple instances of the target protocol stack library may be opened to divert interface calls associated with the network application to the target protocol stack. A hardware test bed may be emulated to which the network application may be applied.

39 Claims, 17 Drawing Sheets

(56) References Cited

U.S. PATENT DOCUMENTS

| | | | |
|---|---|---|---|
| 7,844,690 B1* | 11/2010 | Durham et al. | 709/223 |
| 7,873,700 B2* | 1/2011 | Pawlowski et al. | 709/213 |
| 7,873,965 B2* | 1/2011 | Hayton et al. | 719/315 |
| 7,930,164 B1* | 4/2011 | Grier et al. | 703/22 |
| 7,966,294 B1* | 6/2011 | Gupta et al. | 707/654 |
| 7,975,017 B1* | 7/2011 | Kuzkin et al. | 709/208 |
| 8,264,972 B2* | 9/2012 | Joyner | 370/250 |
| 8,600,726 B1* | 12/2013 | Varshney et al. | 703/26 |
| 2001/0015984 A1* | 8/2001 | Lenz et al. | 370/469 |
| 2002/0156885 A1* | 10/2002 | Thakkar | 709/224 |
| 2003/0093259 A1* | 5/2003 | Kolbe | 703/22 |
| 2004/0210665 A1* | 10/2004 | Fujinami et al. | 709/230 |
| 2004/0254777 A1* | 12/2004 | Foreman et al. | 703/21 |
| 2005/0138114 A1* | 6/2005 | Connor et al. | 709/203 |
| 2005/0207425 A1* | 9/2005 | Choo | 370/395.52 |
| 2006/0005186 A1* | 1/2006 | Neil | 718/1 |
| 2006/0092849 A1* | 5/2006 | Santoso et al. | 370/244 |
| 2006/0101495 A1* | 5/2006 | Yoshida et al. | 725/78 |
| 2007/0299650 A1* | 12/2007 | Tamayo et al. | 703/27 |
| 2008/0270107 A1* | 10/2008 | George et al. | 703/28 |
| 2009/0177781 A1* | 7/2009 | Mosek | 709/228 |
| 2009/0271171 A1* | 10/2009 | Nakayama et al. | 703/23 |
| 2011/0090823 A1* | 4/2011 | Silver | 370/261 |
| 2012/0059921 A1* | 3/2012 | Serban et al. | 709/223 |

* cited by examiner

| Control Interfaces | |
|---|---|
| Interfaces | Description |
| socket() | Create a new socket |
| bind() | Bind to a specific port number |
| listen() | Start to listen for clients |
| accept() | Wait for clients to connect |
| connect() | Connect to a server |
| getsockopt() | Get the socket options |
| setsockopt() | Set the socket or protocol stack parameters |
| ioctl() | I/O control of sockets |

701

| Data Interfaces | |
|---|---|
| Interfaces | Description |
| sendto() | Create a new socket |
| send() | Bind to a specific port number |
| write() | Start to listen for clients |
| recvfrom() | Wait for clients to connect |
| recv() | Connect to a server |
| read() | Get the socket options |

SYSTEM AND METHOD FOR VIRTUALIZATION OF NETWORKING SYSTEM SOFTWARE VIA EMULATION

CROSS REFERENCE TO RELATED APPLICATIONS

This application claims the benefit of the filing of provisional application Ser. No. 61/045,520 filed Apr. 16, 2008.

BACKGROUND OF THE INVENTION

1. Field of the Invention

The present invention is related to techniques for operating software networks and in particular to techniques for running software networks for software applications which require services not provided by the network operating system.

2. Background of the Invention

Many different network software operating systems have been developed most of which are not completely compatible with each other making it difficult to operate network software and hardware devices designed for a first network operating system on a computer network utilizing a second, different network operating system.

What is needed are improved techniques for operating such network hardware and software design for use on the first network operating system on a computer network using the second operating system.

BRIEF DESCRIPTION OF THE DRAWINGS

FIG. 7 is a table of exemplar data and control interfaces and their descriptions.

SUMMARY

Figure 1:
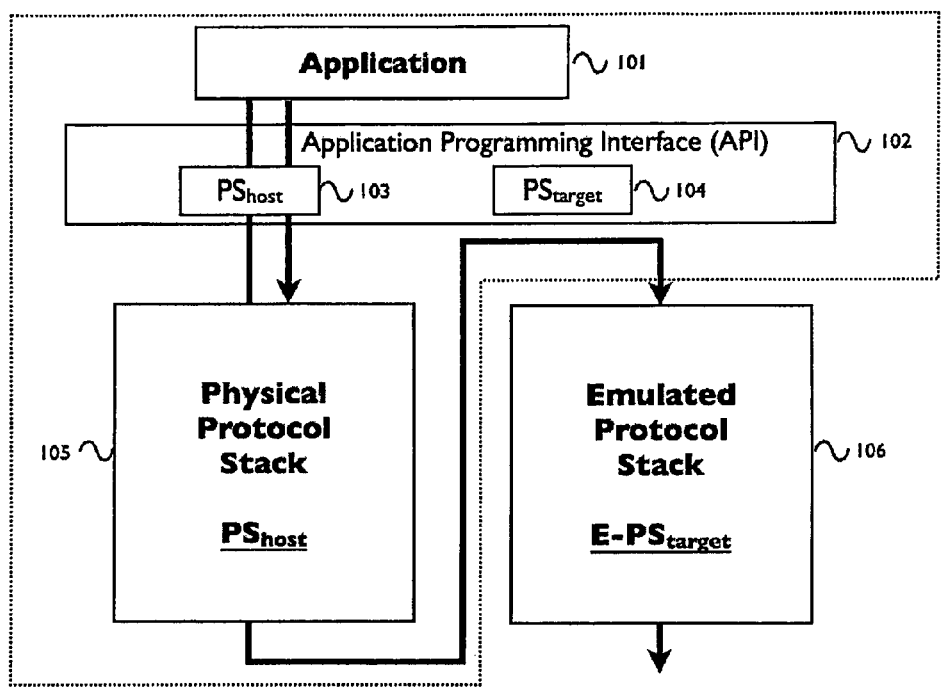
FIG. 1 is a block diagram illustrating the processing path including both the host (physical) and target (emulated) protocol stacks for commands and data from an Application Programming Interface or API.

In a first aspect, a method of running a network application on a host computer using a target protocol stack may include launching a network application on a host computer, opening a target protocol stack library on the host computer before opening a host computer system library and using the target protocol stack library to divert interface calls associated with the network application to a target protocol stack, whereby the network application runs on the host computer as if it were running directly on a computer on which the target protocol stack is available.

The method may include using the target protocol stack library to divert data and control interface calls associated with the network application. The method may also include launching an additional network application on the host computer, opening a second target protocol stack library on the host computer before opening a host computer system library, if any, and using the second target protocol stack library to divert interface calls associated with the additional network application to a second target protocol stack, whereby the additional network application also runs on the host computer as if it were running directly on a computer on which the second target protocol stack is available.

The host computer stack may include a host computer network operating system and host computer network system hardware and the target protocol stack may include a target computer network operating system and target computer network system hardware, wherein at least one of the target computer network operating system or the target computer network system hardware is different than the corresponding host computer network operating system or system hardware.

The method may also include simulating a network environment including wireless communication between a plurality of mobile devices and applying the network application to the simulated network environment. Simulating the network environment may include simulating the network environment including wireless communication between a plurality of mobile devices on a remote computer in network communication with the network application on the host computer. The network application may be not compatible with the host computer protocol stack.

The method may also include opening multiple instances of the target protocol stack library on the host computer and using the multiple instances of the target protocol stack library to divert interface calls associated with the network application to the target protocol stack. The method may include opening multiple instances of the target protocol stack library on the host computer and using the multiple instances of the target protocol stack library to divert interface calls associated with the network application to multiple target protocol stacks.

The method may also include opening the target protocol stack library on an additional host computer and using the target protocol stack library on the additional host computer to divert interface calls associated with the network application to the protocol stack. The target protocol stack may be emulated on the host computer or on a computer networked with the host computer.

The method may further include emulating a hardware test bed and applying the network application to the emulated hardware test bed. The method may further include emulating a first hardware test bed node requiring the target protocol stack, emulating additional hardware test bed nodes and applying the network application in real time to the combined first and additional emulated hardware test bed nodes. The network application may be in a binary form unmodified from a binary form executable on a computer having only the target protocol stack.

The method may include monitoring operation of the target protocol stack to evaluate operation of the network application, for example to evaluate a user's experience. The method may include evaluating operation of the network application during interaction between a human operator and the target protocol stack.

Further, the method may include using an Internet Protocol network communication service in the target protocol stack to provide communication between the network application and other computers communicating by Internet Protocol communication services. The method may also include using the network application to operate hardware networked to the host computer via the target protocol stack. The network application on the host computer may use the target protocol stack in an application level proxy operation.

The method may include using a socket application programming interface to simultaneously control system data and system control communications between the network application and the protocol stack library. The method may further include copying application data to socket buffers to exchange data between the network application and the target protocol stack and using function calls to separately communicate control calls from the network application to the target protocol stack. The protocol stack library to divert data and control interface calls by converting the IP address and port numbers for data and control interface calls between the IP address and port numbers of the host computer and IP address and port numbers of the target protocol stack.

Further, the method may include emulating the target protocol stack on a remote computer networked with the host computer and executing an emulation stub on the remote computer for converting packets received from the target protocol stack to a format recognizable by the target protocol stack on a remote computer. Still further, the method may include emulating the target protocol stack on the host computer and using a modified socket in the target protocol library for system data and control communication between the target protocol stack and services provided on the host computer.

DETAILED DISCLOSURE OF THE PREFERRED EMBODIMENT(S)

In general, a network system refers to software running on two or more machines that can communicate with each other over a wired or wireless medium. Within each such machine in a network system, communication is typically enabled via three key components: the networking application software that generate the traffic either as directed by an end-user or automatically on behalf of users; the networking system software that provides the communication functionality and the networking system hardware or devices that actually transmit or receive the data. The networking system software together with the networking system hardware is typically referred to as the protocol stack.

Networking applications may allow the end-users to communicate with remote machines. Examples of networking applications include web browsers, file transfers, streaming media players, telephony, messaging and so on. The applications can be developed by the end user or provided by any third party vendor (different from the end-user and OS vendor).

The network system software is typically that component of the operating system that mediates interactions between the applications and the networking system hardware. The protocol stack typically includes at least the following key components: transport protocol (for (de-)multiplexing traffic between network applications), networking protocol (for end-to-end communication), route management (for discovering network connectivity) and medium access control (for link communication). Given the variety of the protocol stacks currently available, a networking application must typically specify explicitly which protocol stack it intends to use. The networking system software is usually provided by the operating system vendor since this system is tightly coupled with the core operating system.

Networking system hardware typically refers to network interface cards such as radio transceivers, analog-to-digital signal converters, digital signal processing and so on. Associated with these hardware components are usually software modules available either as firmware or device drivers. The networking system hardware and the associated driver software are typically provided by the respective hardware manufacturers/vendors and are therefore easily changed.

Computer simulation may be provided by a computer program that simulates an abstract model of a particular system. A simulation is typically concerned with an abstract model of the system, typically the internal state of the system, and the primary purpose of using a computer simulation is to gain insight into the operations of the system.

Emulation typically refers to duplication of the functions of one system by a different system, so that the second system behaves like (and appears to be) the first system. An emulator may replace 'live' physical components of a complex system with counterpart representations that can be deployed rapidly at a fraction of cost. True emulation is typically considered to be achieved when any player in the system—hardware, software or even humans—can not discern any difference between a real system component and its emulation replacement.

Network emulation may be a technique where the properties of an existing, planned and/or non-ideal network may be modeled with high fidelity, operating in real time in order to assess performance, predict the impact of change, or otherwise optimize technology decision-making.

Network emulation may be said to differ from network simulation in that a network emulator appears to be a network; end-systems such as computers can be attached to the emulator and will behave as if they are attached to a network. Network simulators are typically programs which run on a single computer, take an abstract description of the network traffic (such as a flow arrival process) and yield performance statistics (such as buffer occupancy as a function of time).

Emulation may be a viable alternative to physical test beds that can provide an evaluation framework that is simultaneously accurate, scalable, repeatable, and flexible. The greatest advantage of an emulation may be reduced equipment and labor costs, all the while, the fidelity of the test data between a physical test and an emulated test remains constant. Emulation test beds are typically flexible in the sense that changing configurations can be easily done, which would otherwise be very difficult, if not impossible, in physical test beds. Moreover the experiments performed in emulation are typically repeatable with controlled parameters to support fair comparison among different system optimization techniques.

Improvements in networking systems may be provided by the use of a Universal Protocol Adaptor (UPA) and/or the use of a Universal Device Interface Adaptor (UDIA). The implementation of one or more embodiments of a UPA will first be described below with regard to FIGS. 1-10. The implementation of one or more embodiments of a UDIA with then be described below with regard to FIGS. 11-15. Thereafter, the use of both UPA and UDIA techniques in networking systems will be described.

A. Universal Protocol Adaptor (UPA)

With regard to the utilization of UPAs, applications typically have to explicitly request which protocol stack they intend to use. As an example, consider an application A that requires the protocol stack PS-1. Any other stack PS-2 may be compatible with PS-1 if the application A can compile and execute correctly with PS-2, albeit with a possibility of different performance. PS-2 may be application-level incompatible with PS-1 if the application A fail to compile and/or execute correctly. This can happen, for example, when PS-1 provides some features that are essential for the application A that are not implemented or implemented differently by PS-2.

Referring now generally to FIGS. 1-10, methods and systems are disclosed which provide for replacing the networking system software that is typically bundled in the operating system or OS, provided by the OS vendor, and the networking system hardware provided by their respective vendors, with counterpart representations of the same as an emulation. The original system be referred to as the original networking system or ONS, and the emulated networking system may be referred to as the ENS. The ENS may replace, on-demand and in a functionally transparent manner, the ONS with a single or multiple instances of the ENS in a manner that does not compromise the application programming interfaces or APIs and the binary level compatibility of the applications. Functional transparency may be said to be achieved when the end-users or the applications cannot discern any differences in the operational details, the capabilities or the performance between the ONS and ENS. It is important to note that is the disclosed techniques may not only replace an ONS with an emulated networking system but may do so without requiring any modifications to the application.

The problem addressed by the use of a UPA may be formulated as follows: On a given platform P, a networking application A (such as Web Browsers, Streaming Media players, Interactive telecommunication, File Sharing and so on) may require the protocol stack $PS_{target}$ not available on the network computer on which application A is to be run. The goals may be to evaluate the performance of an existing application A, even if it is available conveniently only in binary form, with the stack $PS_{target}$; or to implement a new application A with the stack $PS_{target}$ on the platform P.

The problem may be encountered if an implementation of stack $PS_{target}$ is not available on the platform P, for example, because $PS_{target}$ represents an emerging technology and no implementation is currently available, implementations for PStarget are available but not for the required platform P, and/or implementations for PStarget are available for platform P, but are difficult or costly to procure and install or otherwise unattractive. The problem may be encountered because the desired platform has a different stack PShost or an emulation of PStarget or E-PStarget may be available. E-PStarget may run in an emulation environment either on the same platform P or a remote platform.

Appropriate solutions may include executing application A, which may be in binary form, with the emulated stack E-$PS_{target}$. For example, existing application A may only be available in binary format, and solutions that require source code modifications to application A may be impractical. Similarly, any new application A that is targeted for stack $PS_{target}$, can be developed, verified and validated with emulated protocol stack (E-$PS_{target}$). It is also desirable that the functional interface, e.g. the semantics, of the communication between the application A and E-$PS_{target}$ should be the same as that between A and $PS_{target}$. It may also be preferable that any application developed and/or verified for the E-$PS_{target}$, using the UPA, should display identical behavior as running on the real $PS_{target}$.

UPA Detailed Requirements (and/or Capabilities)

Application Programming Interface (API) Compatibility: Any application developed for the ENS should be able to use the same APIs that are exported by the ONS. In order words, it should not be visible to the application developer if the underlying networking system is the original one or emulated.

Application Binary Interface (ABI) Compatibility: Any existing application that was developed for the ONS should work seamlessly with the ENS. That is, there should be no need for access to the source code of the applications for modifications, recompilations and/or relinking into the ENS. In other words, the same application binary should work for both ONS and ENS.

Multiple Instances of ENS: The system should provide the ability to run multiple instances of the emulated networking system software. The implementation itself may be either by running multiple processes for each instance, or running single instance that (de)multiplexing different calls within this instance.

Perceptual Transparency: The end-users of the applications should not be able to perceive any difference in the operation of the applications when using ENS versus using ONS.

Operating System Transparency: No additional support or feature from the Operating System should be required for development, installation and usage of the ENS, more than what exists in the standard distribution versions. As an example, for commercial closed-source OS there should be no requirements for the access to the source code.

Operating System Independence: The development, customization and evaluation environment in ENS should not require any domain knowledge of any specific operating system. That is, the framework should be portable to all the platforms that it supports.

Hot-Pluggable: The ENS system should not require recompiling the operating system kernel and/or restarting the machine in order to be installed, uninstalled or used.

Co-existence with ONS: It should be possible that both ONS and ENS exist simultaneously. That is, some applications may choose to communicate using ENS while others use ONS.

Support Cross Layer Interactions (CLI): The ENS should support cross layer interactions between the applications and networking system software, and between applications and network devices in ways more advanced and flexible than what is possible with ONS.

Flexible Execution Environment (1): The ENS can run in the operating system's user address space or kernel address space or a combination thereof. The actual design should be guided by the requirements of the user and not limited by the design of the system itself.

Flexible Execution Environment (2): The ENS can run on the same machine in which the application is running or alternatively on a remote server.

Flexible Execution Environment (3): In a preferred embodiment, the ENS would not use undocumented, hidden or otherwise non-standard features that are not advised by the OS vendor that may lead to compromising the security or stability of the OS.

Network applications make use of the communication capability in an operating system through a set of well defined APIs. These interfaces (typically BSD sockets or WinSock) may be used by the applications directly or via higher level abstraction APIs (RPC, CORBA, AJAX etc). In addition, the application must be able to access other functionalities provided by the system such as memory, disk space, graphical user interface and so on.

The use case in this section refers to the capability that the applications can be developed utilizing the same communication APIs, libraries of their higher level abstraction and the non-communication based libraries as are available in any development platform, except that the networking system software itself is implemented as an emulation.

The benefits of this use case are:

(a) Applications can be developed and tested on wide variety on protocols stacks without the need for installing the latter in the development platform or migrating the application itself to a different platform that support those protocol stacks. For example, a cellular protocol stack based application can be developed on a machine that does not have this stack; once the application is developed, debugged and evaluated it can be migrated as it is, even in binary format, to any platform that supports the stack. Another example is that applications written for WiFi (IEEE 802.11 based) networks can be tested on the same evaluation machine for other kinds of networks such as GSM, CDMA, WiMAX and so on.

(b) The disclosed techniques can be used to develop and test applications for futuristic protocol stacks, the physical implementations of which are not currently available. Hence innovations in application development and the protocol stack development can proceed in parallel. This concept of isolation of dependencies has been the founding principle of the layered architecture in the Internet and believed to have played an important role in its success.

(c) Applications can be developed that require cross layer interactions with other layers of the protocol stack. Achieving this goal in a real operating system requires extensive domain knowledge, is extremely limited in capabilities or even impossible in some cases.

(d) Because the applications can be prototyped using the same APIs and libraries as a real development system, the applications developed with this approach can be seamlessly migrated to deployment without requiring substantial modifications. The conventional approach of prototyping applications in a simulator environment does not provide the same APIs and the complete set of libraries as the disclosed approach, making it difficult to directly use the applications outside of the simulation environment.

For Application-Centric Evaluation of Network Systems

In recent years, there has been an increased emphasis on evaluating system performance at the application layer. Performance of wireless systems has traditionally been evaluated using network layer statistics, but as these systems mature and become available to consumers, there needs to be a greater emphasis on the evaluation of such systems from the perspective of the end users. In other words, whereas in the past, performance optimization techniques may be evaluated with respect to their impact on improving corresponding network layer statistics, it is more beneficial to evaluate advances in networking concepts with respect to their impact on improving application performance. The disclosed techniques may provide the following benefits for the application-centric evaluations:

The conventional approach is to model the applications within the simulation environment, wherein the traffic generated by the application models is used to drive the network and subsequently the statistics are collected for the performance of the applications. While this approach is possible for simplistic applications such as constant or variable rate data streams, HTTP etc; it becomes difficult or infeasible for more complex applications such as media players, telephony, web browsers etc. Modeling these applications within simulation is difficult and requires substantial effort. The disclosed approach avoids this step of modeling and allow native applications, unmodified and in their binary format, to be used within a simulation study to drive the traffic. The performance of applications as affected by the network conditions can be directly observed.

The advantage of including real applications also offers human-in-the-loop capability in network evaluations. The analyst, in real time, can both observe the performance of the application as well as interact with the applications.

Since applications instances can be multiplexed on a protocol stack present in the simulator, it may also be possible to conduct application scalability evaluation with user interaction enabled. In this approach, the user may be to configure multiple instances of applications running on one machine to associate with different nodes in the simulation and scale up with the number of applications instances. This is in contrast to the conventional approach of running a single emulated node per physical machine. The resources required to model a network with, say, thousands of applications conventionally would typically require as many physical machines; with the disclosed approach, this can be achieved with a single or a small set of physical machines.

For Simulation Based Analysis of Network Systems

This use case refers to the networking system software analysts who use simulation methodology for prototyping, validation, testing and evaluation. The disclosed approach has the following benefits for this community:

(a) To generate traffic for evaluating the protocol stack, the developers and analysis would conventionally either use stochastic models of traffic or custom build these within the simulation environment. However, as mentioned earlier, the effort in modeling complex applications can be substantial. The disclosed approach eliminates this effort by allowing existing applications to be used directly with the evaluation environment. Thus, if the implementation of an application is available, there may be no need to model it again.

(b) The prototypes of the networking system software can be tested and evaluated in an operational network. The developers can create or customize exiting protocol stack and insert it within an operational network.

Further, the architecture can be extended beyond the objective of interfacing a real world application to a stack/scenario present in a simulation. The same architecture can be employed to interface an application running on one machine to a protocol stack running on another machine as in an application level proxy operation. Also, applications running on devices which do not have a protocol stack or have a non IP protocol stack can 'borrow' a IP based protocol stack running on another machine to communicate with other nodes on the IP network.

Referring now to FIG. 1, host platform 1-10 may include application 101, API 102, including $PS_{host}$ API 103 and $PS_{target}$ API 104, as well as host protocol stack or $PS_{host}$ 105. The protocol stack required for application 101 by $PS_{host}$ API 103 flows directly to $PS_{host}$ 105. The protocol stack needed for application 101 via $PS_{target}$ API 104 may be emulated protocol stack or $PS_{target}$ 106 and may be present on host system 1-10 or a remote platform. Effective operation as shown in FIG. 1 requires that protocol stacks $PS_{host}$ 105 and $PS_{target}$ 106 be compatible. However, even if they are identical, the traffic from application 101 first traverses through $PS_{host}$ 105 before reaching E-$PS_{target}$ 106. Protocol stack $PS_{host}$ 105 may thereby modify the traffic to or from $PS_{target}$ API 104, e.g. the data itself, the rate of data transfer or any other property of the traffic. As a result, E-$PS_{target}$ 106 receives modified traffic rather than the raw traffic from application 101 via $PS_{target}$ API 104 which may be the result of what can be called the "extra stack effect", which can significantly affect an evaluation analysis of application 101.

Figure 2:
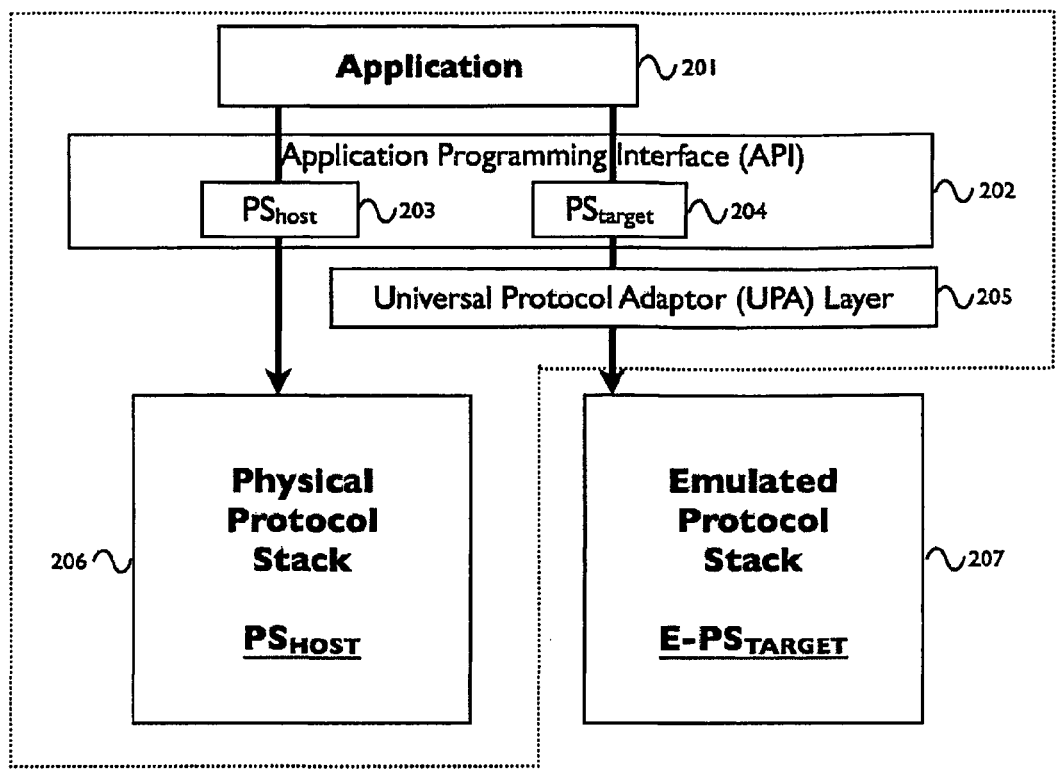
FIG. 2. is a block diagram illustrating the programming path through a Universal Protocol Adaptor or UPA between an API and a physical or emulated protocol stack.

Referring now to FIG. 2, host system 2-10 may include application 201, API 202, including $PS_{host}$ API 203 and $PS_{target}$ API 204 and UPA layer 205. Application 201 which may be in communication with $PS_{host}$ 206 via $PS_{host}$ API 203 and/or emulated or physical $PS_{target}$ 207 via $PS_{target}$ API 204. $PS_{target}$ 207 which may be on host system 2-10 or emulated on a remote host. UPA 202 may pretend to application 101 that the protocol stack $PS_{target}$ physically available on host platform 2-10.

UPA 202 may thereby provide an apparently direct interface between application 202 and $PS_{target}$ 207 which avoids a requirement for, or a connection through, a physical protocol stack $PS_{target}$ such as physical protocol stack 206.

Figure 3:
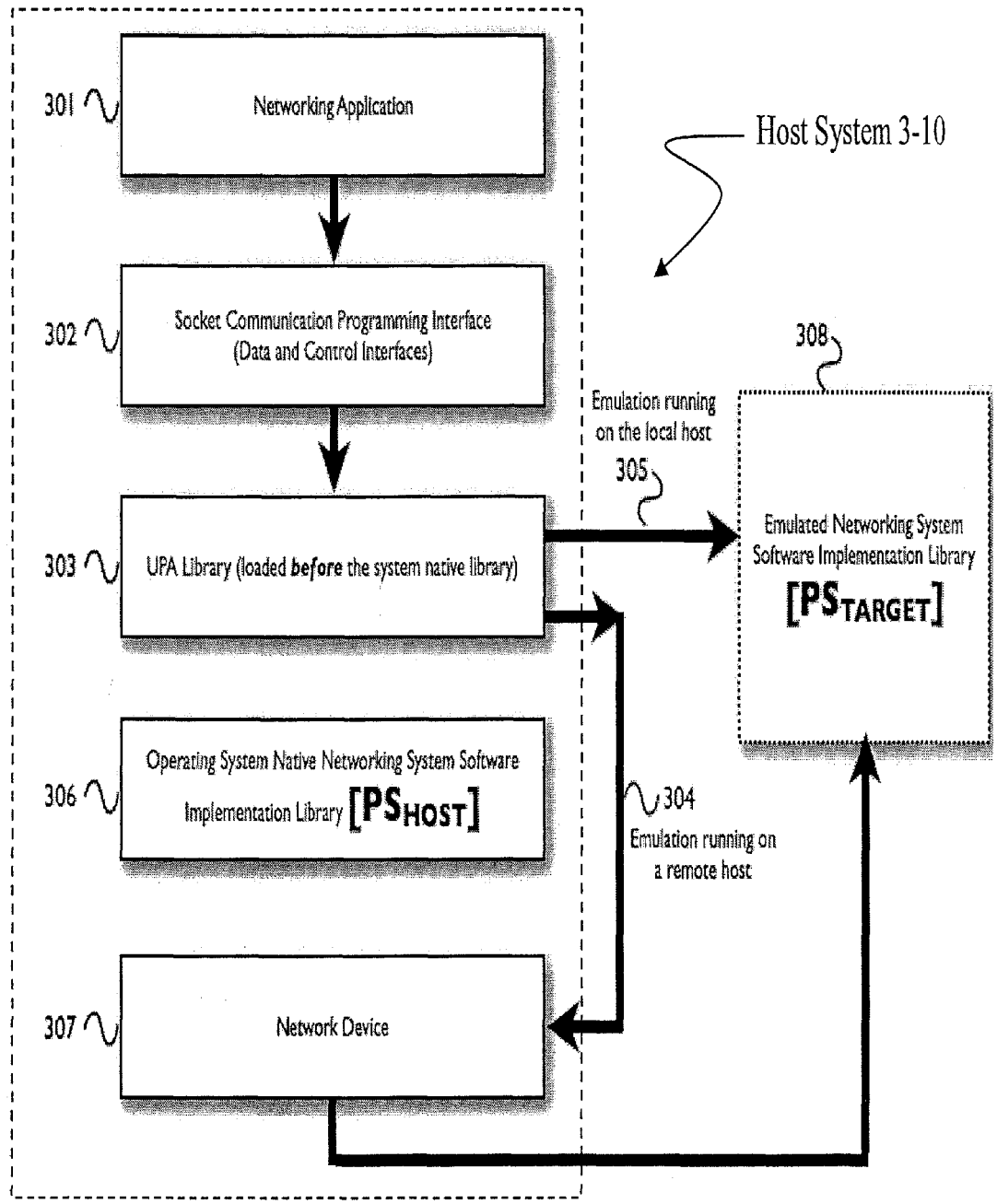
FIG. 3 is a block diagram of a UPA.

Referring now to FIG. 3, host platform 3-10 includes networking application 301, networking socket programming interface 302, having both data and control interfaces, networking system software including protocol stack $PS_{host}$ 306 and networking device 307. These components may be included in conventional off the shelf software.

In general, networking application 301, such as a web browser, streaming media player, messaging and so on, makes use of socket application programming interface 302 for communicating with applications on a remote machine. APIs, such as socket programming interface 302, are typically standardized for different classes of operating systems, for example, the Unix based platforms provide the Single Unix Specification API while the Windows based platforms provide the WinSock API. Beneath interface 302, different platforms provide their own native implementations of protocol stack $PS_{host}$ 306. The actual implementation of the stack varies across different platforms as well as with the networking technologies (for example, IP version 4, IP version 6, GSM and so on). Among the responsibilities of $PS_{host}$ 306 is to transmit or receive the data packets across the network using networking device 307.

Host platform 3-10 may also include emulated protocol stack $PS_{target}$ 308 which may be used to replace protocol stack $PS_{host}$ 306 which is typically provided by the OS vendor. Applications, such as network applications 301, may then be made to believe that they are running directly on top of emulated protocol stack $PS_{target}$ 308. $PS_{target}$ 308 may be implemented in a discrete event network simulator or as some other process either on the host platform 3-10 or a remote platform.

UPA library 303 is a set of files or library, located between socket programming interface 302 and the host system's native protocol stack $PS_{host}$ 306, which diverts all networking communication related calls by network application 301 to PStarget 308, bypassing the host protocol stack, $PS_{host}$ 306. UPA 303 may be implemented as a dynamically loaded and shared library, i.e. an .so file in Unix based systems or a .dll file for Windows based systems.

When networking application 301 is launched, various system libraries are loaded that application 301 intends to use. UPA library 303 is preferably loaded before any other library is loaded. Once UPA library 303 has been loaded into applications 301, UPA 303 intercepts data and control calls directing them to the emulated protocol stack, $PS_{target}$ 308. UPA library 303 may use inter-process communication techniques 305, such as pipes or shared memory if, for example if $PS_{target}$ 308 is emulated on host system 3-10. UPA library 303 may also use network communications 304, e.g. 'raw' sockets, to communicate via network device 307 if $PS_{target}$ 308 is emulated on a remote platform. In this manner, application traffic between application 301 and $PS_{target}$ 308 is not processed by $PS_{host}$ 306 before processing by $PS_{target}$ 308.

Figure 4:
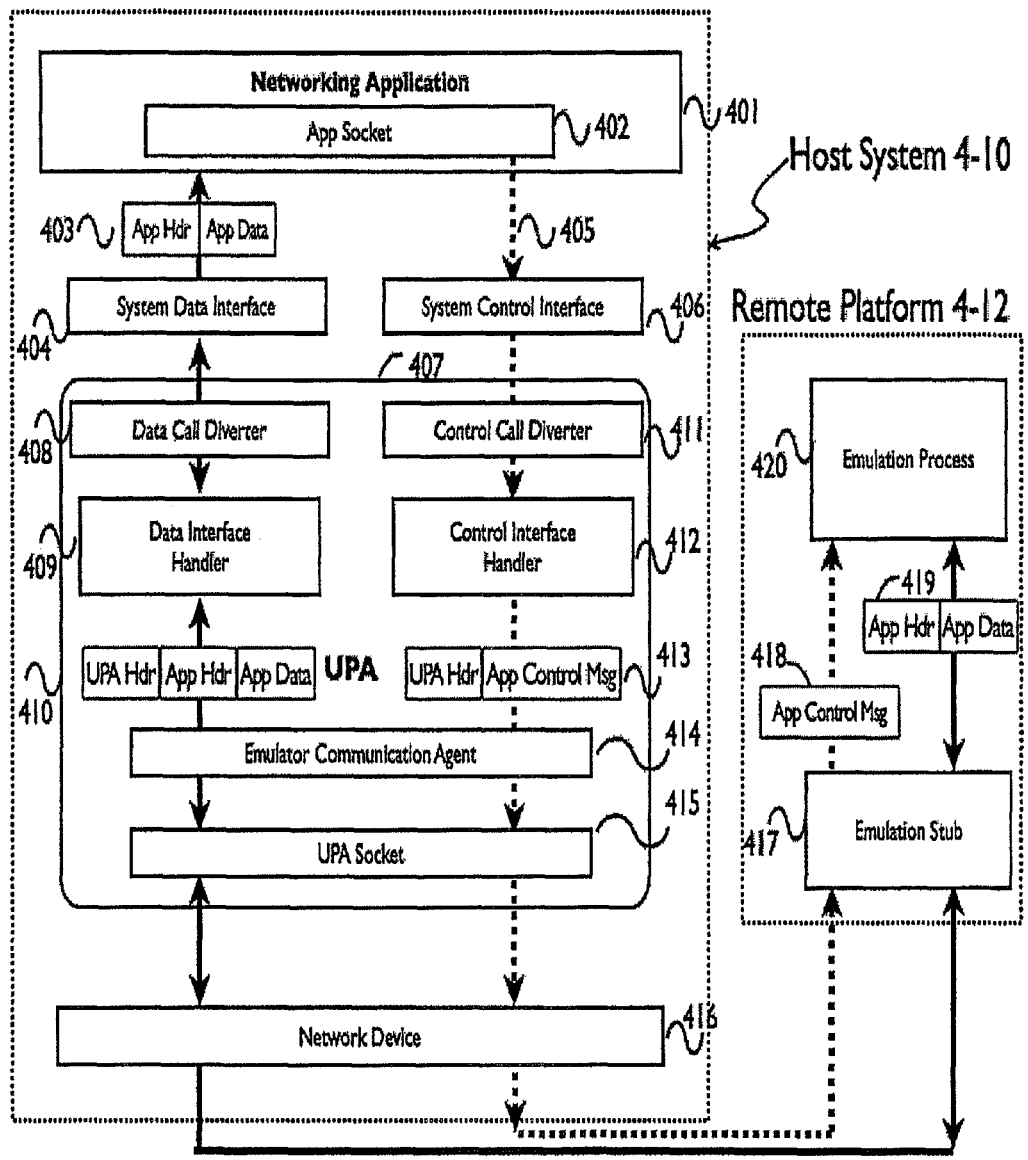
FIG. 4 is a block diagram illustrating the function flow of an implementation of a UPA.

Referring now to FIG. 4, in a preferred implementation of a UPA layer, networking application 401 accesses remote services through one or more application sockets 402. Application sockets 402 may include or have access to system data interface 404 for transmission and reception of data, and system control interface 406 for other, non-data transfer operations. Applications sockets 402 may access system data interface 404 by copying application data to socket buffers 403 and may access system control interface 406 via function calls 405. A list of these functions, for both data and control interfaces 404 and 406 is described below in greater detail with regard to FIG. 7.

UPA library 407 is preferably attached to networking application 401 before any other library, such as $PS_{host}$ 306 shown in FIG. 3 above, whereby UPA library 407 can interact with the emulated $PS_{target}$ 420 either by local inter-process communication or over the network. In the more general case, UPA library 407 may communicate with $PS_{target}$ 420 emulated on a remote host by sending and receiving data via network device 416.

UPA library 407 includes data call diverter 408, data interface handler 409, data control call diverter 411, control call diverter 411, control interface handle 412, emulation communication agent 414 and UPA socket 415 on system host 4-10 as well as emulation stub process 417 which may reside on remote platform 4-12. Data and control diverters 408 and 411 capture data and control calls from application socket 402 via system data and control interfaces 404 and 406, respectively and apply them to UPA library 407 so that data and control calls are not applied to the host protocol stack, not shown in this figure.

For each application socket 402, UPA library 407 may open a new UPA socket 415 which may be considered to be a 'raw' socket, that is, a socket which does not use the host system's protocol stack. Emulator communication agent 414 handles bookkeeping tasks such as storing the IP address and port number of emulation process $PS_{target}$ 420, assigning and storing port numbers for applications sockets 402 and maintaining a mapping between the addresses and port numbers across the emulated network and the physical network.

Emulation stub 417 executes along with emulated $PS_{target}$ 420 for receiving packets from UPA library 407 and converting such packets to a format that is recognizable by emulated $PS_{target}$ 420. Emulation stub 417 also receives information from $PS_{target}$ 420 and converts such information to a format compatible with UPA library 407.

When $PS_{target}$ 420 is located on host system 4-10, modifications to UPA socket 415 and emulation stub 417 may be required. Modifications to UPA socket component 415 may replace the "raw socket", as discussed above, with inter-process communication primitives such as Unix Domain sockets, INET socket connected to loop-back addresses, pipes, shared memory etc. Unix Domain sockets are preferably used for Unix based platforms and INET sockets with loop-back addresses are preferably used for Windows based platforms.

Data and control interface diverters 408 and 411 divert socket related calls from the applications away from the native protocol stack of host system 4-10 into UPA library 407 where they can subsequently be delivered to emulated protocol stack $PS_{target}$ 420, for example on remote platform 4-12 which may be implemented for a Unix based system utilizing the environment variable 'LD_PRELOAD'.

The OS may be notified via the following call $ export LD_PRELOAD=/path/to/upa-library.so to ensure that UPA library is loaded before any other library.

In a Windows based system, the Detours application may be used and the corresponding method is $ detours.exe-setpath \path\to\upa-library.dll.

Data and control interface handlers 409 and 412 provide the correct attributes of $PS_{target}$ 420 to application 401 on host system 4-10 where $PS_{target}$ 420 may not actually be available. In particular, data interface handler 409 may handle application data transfer and conversion of addresses.

Figure 5:
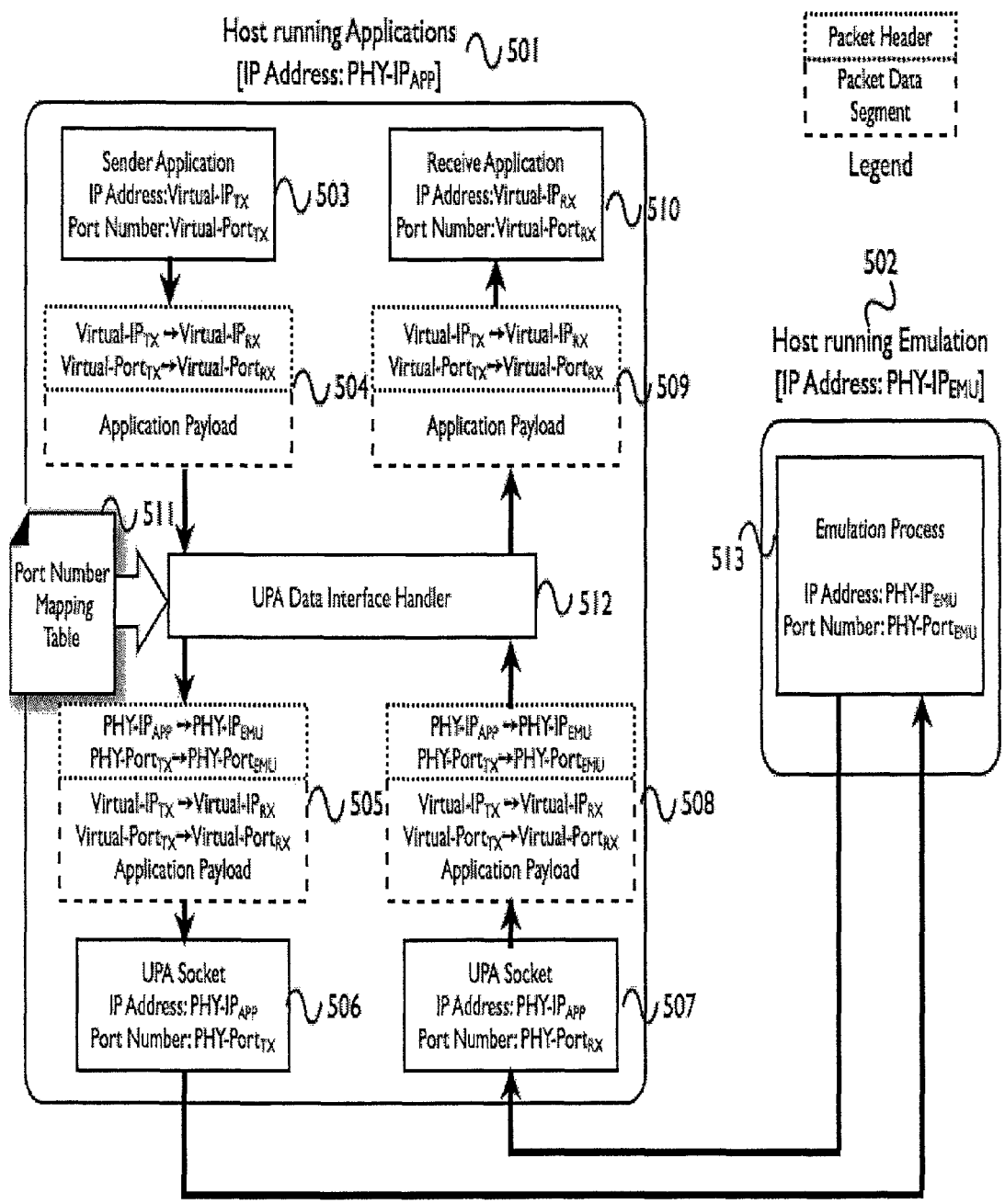
FIG. 5 is a block diagram of a UPA data interface handler.
Figure 6:
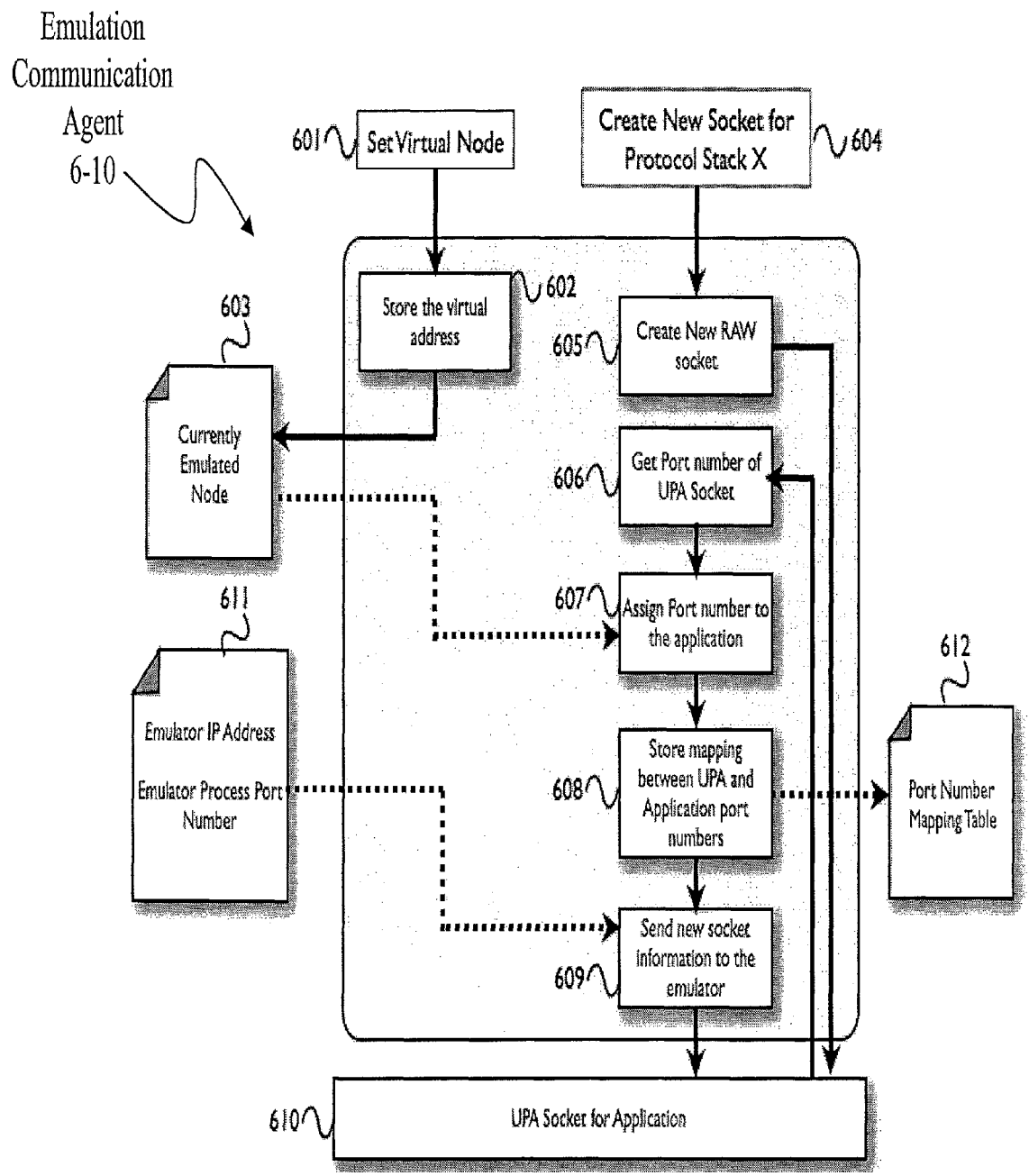
FIG. 6 is a block diagram of a UPA emulation communication Agent and associated data structures.

Referring now to FIG. 5, operation of data interface handler 5-10 is described for the remote emulation case where the applications are running on local host platform 501 and emulation process 513 is running on remote platform 502. Two generalized applications are illustrated on the host 501, data sender application 503 and corresponding data receiver application 510.

UPA Data interface handler 512 handles the differences in addressing schemes between the actual physical machines such as host 501 and the emulated network such as emulation process 513 which may be running on remote platform 502. In particular, system host 501 may have physical IP address of $PHY\text{-}IP_{APP}$ while emulation process 513 may be running on remote platform 502 with address $PHY\text{-}IP_{EMU}$ at the port number $PHY\text{-}PORT_{EMU}$. Sender application 503 may have the virtual address $Virtual\text{-}IP_{TX}$ at port $Virtual\text{-}Port_{TX}$ and receiver application 510 may have the address $Virtual\text{-}IP_{RX}$ at port $Virtual\text{-}Port_{RX}$. Sender application 503 sends out a packet with these virtual addresses in packet header 504, which are captured by data interface diverter 408 shown above in FIG. 4, and handed to the data interface handler 512.

UPA data interface handler 512 looks up the specified port number in mapping table 511 and transforms the incoming packet as shown at packet transform block 505: the original data packet with the payload and the headers are encapsulated into the payload section of the new packet and new headers are created with physical address and port number that correspond to those required by emulation process 513. This packet is then handed off to UPA socket 506 for delivery to emulation process 513 on host 502.

At the other end of the communication channel, when packet 508 is received from emulation process 513 at UPA socket 507, UPA data interface handler 512 strips off the header section of this packet and creates a new header from the information that was encapsulated in the payload section. This new transformed packet 509 is then delivered to receiver application 510.

As a result, applications such as sender 503 and receiver 510 can communicate with each other conveniently and efficiently even though the emulated protocol stack $PS_{target}$ 308, shown in FIG. 3, is emulated in emulation process 513 on remote host platform 502 and is not actually available on local platform, host 501. Further advantageously, multiple applications can run on single platform, but connect to different emulated protocol stacks. That is, while few applications connect to emulation stack #1, others can connect to emulated stack #2 and so on. This is described in greater detail below with regard to FIG. 6.

Referring now to FIG. 6, and again to FIG. 4, control interface handler 412 handles the non-communication related aspects for application socket 402. Application socket 402 accesses system control interface 406 via function calls 405. Control interface handler 412 creates a data packet corresponding to each function call 413 for delivery to emulation process 420, which is applied to the emulated protocol stack, $PS_{target}$.

In particular, emulation communication agent 610 provides similar 'book-keeping' tasks as performed by emulation communication agent 411 for UPA library 407. When UPA library 407 is the loaded for the first time, UPA library 407 acquires the information via environmental variables regarding the host address and the port number on which emulation process 420 is running. This information may be stored locally within emulator IP address and process port number block 611.

After UPA library 407 has been loaded but before any other library or application is loaded, UPA library 407 identifies a virtual node in emulation process 420 to be represented by this particular instance of UPA library 407. This task may be performed by "Set Virtual Node" command 601 and may be implemented via environmental variables. The specified, currently emulated or virtual node may be stored in table 603. For example if the virtual node is set to node 5, then all the applications that are launched subsequently will be assumed to be executing on the node number 5 in emulation process 420. Note that this node address can be changed at any point in time, and any application launched after that will execute on the new node. The prior applications will continue to execute on the node on which they were launched first.

As an example, consider the following $ setvirtuamode 1

$ startserverapplication.exe $ setvirtualnode 2

$ startclientapplication.exe.

Here, the virtual node is first set to node number 1 and a server application is started on this node. Subsequently, the virtualization is changed to node number 2. The client application that is launched after that will run on node 2. However, the server application will continue to run on node 1. In this way, multiple applications (the multiple instances as described above for an ENS) can be running on different virtual, emulated nodes on a single physical platform. Further, the multiple applications can be run with potentially different kinds of protocol stacks, e.g. different protocol stack $PS_{target}$ on a single physical platform.

Emulation communication agent 6-10 creates and maintains port number mapping table 612 when a new socket is requested by an application. When the application creates a new socket for a given protocol stack type, as shown for example by create new socket for protocol stack X command 604, by the socket( ) call, it is routed via control call diverter 411 and control interface handler 412 to emulation communication agent 6-10. Emulation communication agent 6-10 provides create new raw socket request 605 to the host operating system to create a new "raw" UPA socket 610. Upon successful creation of socket 610, get port number command 606 retrieves the port number, such as PHY-Port, via UPA socket 610. Emulation communication agent 6-10 then assigns a virtual port number to the application socket via assign port number command 607 by consulting currently emulated node table 603. This virtual port number can be different from the physical port number, in fact, there can be multiple applications that have the same virtual port numbers. Emulation communication agent 6-10 stores a mapping between the physical and virtual port numbers via store mapping between UPA and application port numbers 608 in mapping table 612. Send new socket information agent command to the emulator command 609 informs emulation communication agent 411 of the new socket and its attributes.

Figure 8:
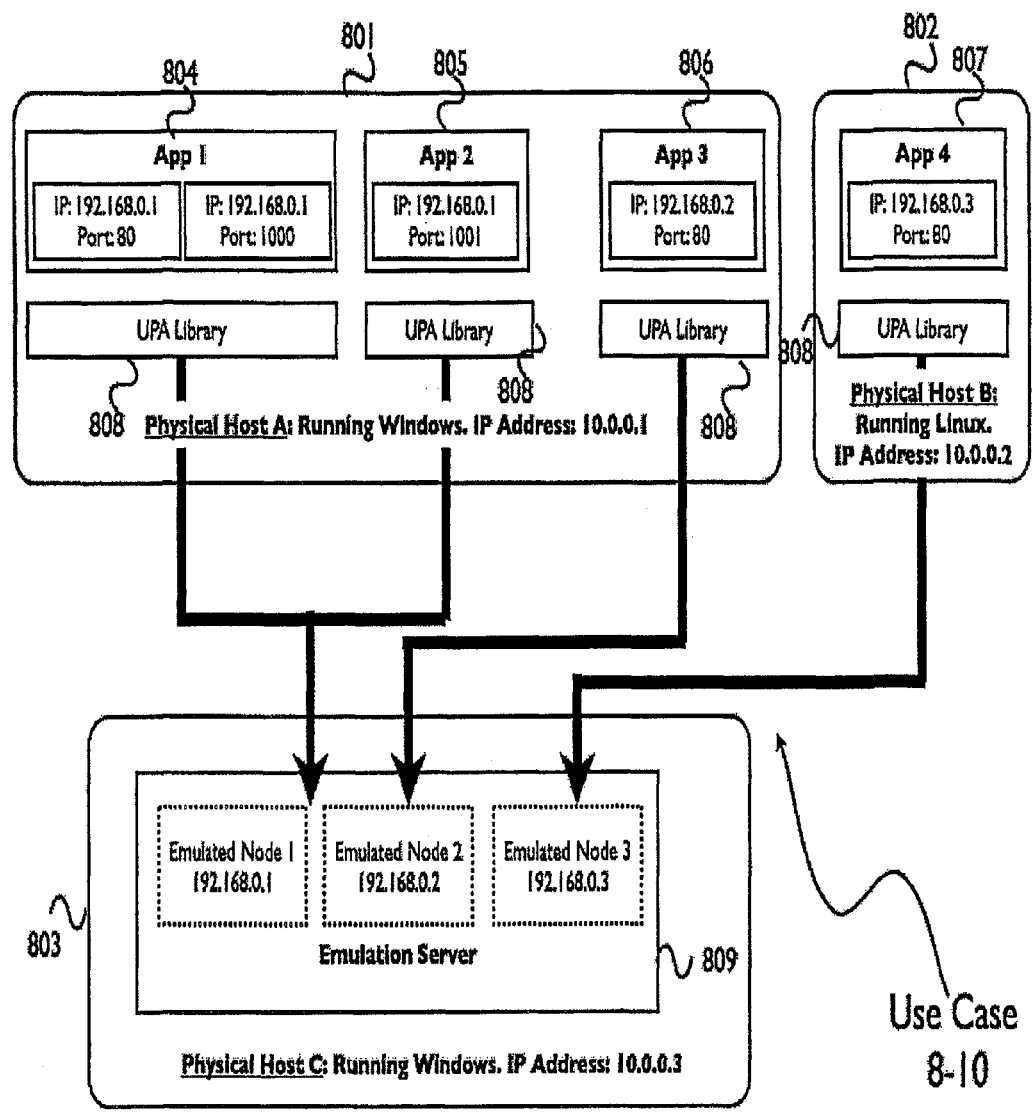
FIG. 8 is a block diagram of an example of a use case for a UPA.

Referring now to FIG. 8, examples of the various tasks for the UPA architecture and its implementations are illustrated in use case 8-10. A virtual network may include three nodes such as emulated node 1, emulated node 2 and emulated node 3. The IP addresses of these virtual nodes may also be virtual in that there may not exist any physical machine in the set up that are assigned these as real addresses. These virtual addresses may be identified as 192.168.0.1, 192.168.0.2 and 192.168.0.3 using the IP version 4 based addressing scheme although the UPA architecture can may support various types of addressing scheming, including IP version 6, cellular, WiMAX, sensor based and others.

Four applications, such as App 1, App 2, App 3 and App 4 may be run on these three virtual emulated nodes. For example, App 1 and App 2 may run on emulated node 1, while App 3 runs on emulated node 2 and App 4 runs on emulated node 3. Furthermore, App 1 may have two open sockets while the remaining applications have only one open socket. The aforementioned mapping between applications and sockets with the emulated node implies that the two sockets from App 1 and the socket from App 2 should have 192.168.0.1 as the local address, the socket of App 2 should have 192.168.0.2 as local address and the socket of App 3 should have 192.168.0.3 as the local address.

The next concern is the port numbers for these sockets. Port numbers are integer values that uniquely identify different sockets within a computing host such as a desktop, laptop, PDA etc. That is to say, all the sockets for all the applications on an emulated node typically have different port numbers. However, it is possible that applications that run on different computing hosts may have the same port number. In the example, the three sockets in App 1 and App 2 have different port numbers, as they run on the same emulated host. The first socket of App 1 and the sockets from App 3 and App 4 have same port number, which is correct as these three applications run on different nodes.

A further concern is the host machines or platforms on which the emulation server and these UPA-enabled applications are running. In use case 8-10, there are three physical platforms: physical host A, physical host B and physical host C. Platform C hosts the emulation server as a user-level process. Platforms A and B hosts the applications. Whereas App 1, App 2 and App 3 run on platform A, the App 4 runs on platform B. That is, it is possible that applications that correspond to different emulated nodes can run on different physical machines. Also note the differences in the configuration of these physical machines. First, machine A is running Windows operating system and machine B is running Linux. That is, the UPA architecture is portable to multiple operating systems even within a single setup. Second, the physical addresses of these machines, 10.0.0.1, 10.0.0.2 and 10.0.0.3, respectively may be different from the virtual IP addresses that were assigned for the applications.

Finally, all the applications may be 'third-party' applications and no modifications may be required for them, for the source code, for binaries, for configuration files or even the usage of applications.

Having described this example use case 8-10, the following table reviews the various challenges of the UPA architecture, relate them to use case 8-10 and list at least some of the mechanisms and approaches adopted in a preferred embodiment to address them.

| Challenge | Example | Solution |
|---|---|---|
| Diverting traffic away from host stack to emulated protocol stack | | |
| Should divert the socket call only. All other calls (to GUI, file system, memory system etc) should not be affected. | The UPA library should affect only the sockets within the applications. | The UPA library "overrides" only the communication socket APIs as enumerated in FIG. 7. All the remaining calls are handled by the native operating system. |
| Should affect those applications only that have explicitly requested the use of UPA | Only App 1 through 4 will use ENS. All other applications (user or kernel) will continue to use ONS | The user (or the application) has to explicitly load the UPA library. If the library is not loaded prior to launching an applications, the application will use ONS. |
| Should work even if the APIs for the emulated stack are not supported by the operating system | An IPv6 application on a IPv4 platform (not shown in use case 8-10) | The UPA library provides the API for the protocol stacks that are not supported by the ONS. |
| Should be able to request a particular emulated node | App 1 & 2 request emulated node 1, App 3 request emulated node 2 and App 4 request emulated node 3 | Achieved by SetEmulationNode command. This command updates an environment variable that is subsequently read by the UPA library to appropriately set the emulated node. |
| Programming and Binary compatibility of Applications | | |
| Should not require special privileges from the operating system | | LD_PRELOAD in Linux and Detours.exe in Windows do not require any special privilege from the operating systems. |
| Hot-pluggable: should not require restarting the physical host | | LD_PRELOAD in Linux and Detours.exe in Windows can be loaded (and unloaded) at any time. |
| Should not require any modification to the applications (their source code, their binary code or their usage guidelines) | The App 1 through 4 are the same applications, and used in the same way, as on a physical platform with ONS | The design of UPA as an external dynamically loadable library ensures that applications do not have to be modified |
| Managing multiple applications and multiple sockets | | |
| An application may have multiple sockets | App 1 has two open sockets | The UPA library maintains separate data structures for each open socket. An individual data structure for a socket maintains information for that socket, and does not interfere with other open sockets. |
| Applications running for different emulated nodes may have the same port number | App 1, App 3 and App 4 have same port numbers | The UPA library takes the responsibility of assigning port numbers to applications. The library ensures that if two applications have different address, then they can be assigned same port number. A mapping table is kept by UPA library to match the UPA assigned port numbers and OS assigned port numbers. |
| Applications running for the same emulated node must | The three sockets in | UPA library maintains separate data structures for |

-continued

| Challenge | Example | Solution |
| --- | --- | --- |
| have different port numbers | App 1 and App 2 have different port numbers | each open socket within an application. These data structures collude information to ensure that any port number is not repeated. For the case of multiple applications, shared memory based communication is used to for this purpose. |
| Addressing of the applications ||| 
| All applications running on the same emulated node must have the same IP address | All three sockets for App 1 and App 2 (running on emulated node 1) have same IP address | The UPA library learns of the emulated node id from the environment variables. It, then, requests the correct IP address for this node from the emulation server and assigns it to the applications. Thus, all applications for a given emulated node will have the same address. |
| Applications running on different emulated nodes must have different IP addresses | App 1 & 2 have different address than App 3 as well as with App 4 | The mechanism described above also ensures that the addresses for applications running on different emulated nodes are also different. |
| Packets generated by application should give the virtual IP address as destination address | Packets sent to App 3 should have 192.168.0.2 as destination address and not 10.0.0.1 | The UPA library modifies the outgoing data packets by storing a 'virtual' header in the packet payload and create a new 'physical' header, see for example the structure in FIG. 5. |
| An application should receive packets with virtual IP address as the source address | Packets received from App 3 should have 192.168.0.2 as source address and not 10.0.0.1 | The UPA library modifies the incoming data packets by removing the 'physical' header in the packet payload and creating the 'virtual' header that was stored in the packet payload, see for example FIG. 5. |
| Running on multiple physical platforms |||
| Applications for different emulated nodes may run on different computers | App 4 runs on different machine than App 1, 2 and 3 | The design of UPA library does not require communicate between different instances of UPA for applications that are running on different emulated nodes. Hence, these applications can run on different physical hosts. |
| Different platforms may have different operating systems | Host A is running Windows OS while Host B is running Linux | Ccommunication between the UPA and the emulation server do not utilize any specific feature of any given operating systems. The communication architecture is generic and portable. |
| Connecting with the emulation server |||
| The applications may connect with local emulation server | | The UPA uses 'raw sockets' to connect with the emulation server. If the destination address is given as the loop-back address (127.0.0.1), then UPA can communicate with a local emulation server. |
| The applications may connect with remote emulation server | The emulation server is running on remote machine C | The UPA uses 'raw sockets' to connect with the emulation server. If the destination address is given as the IP address of the remote machine, then UPA can communicate with a remote emulation server. |

Figure 9:
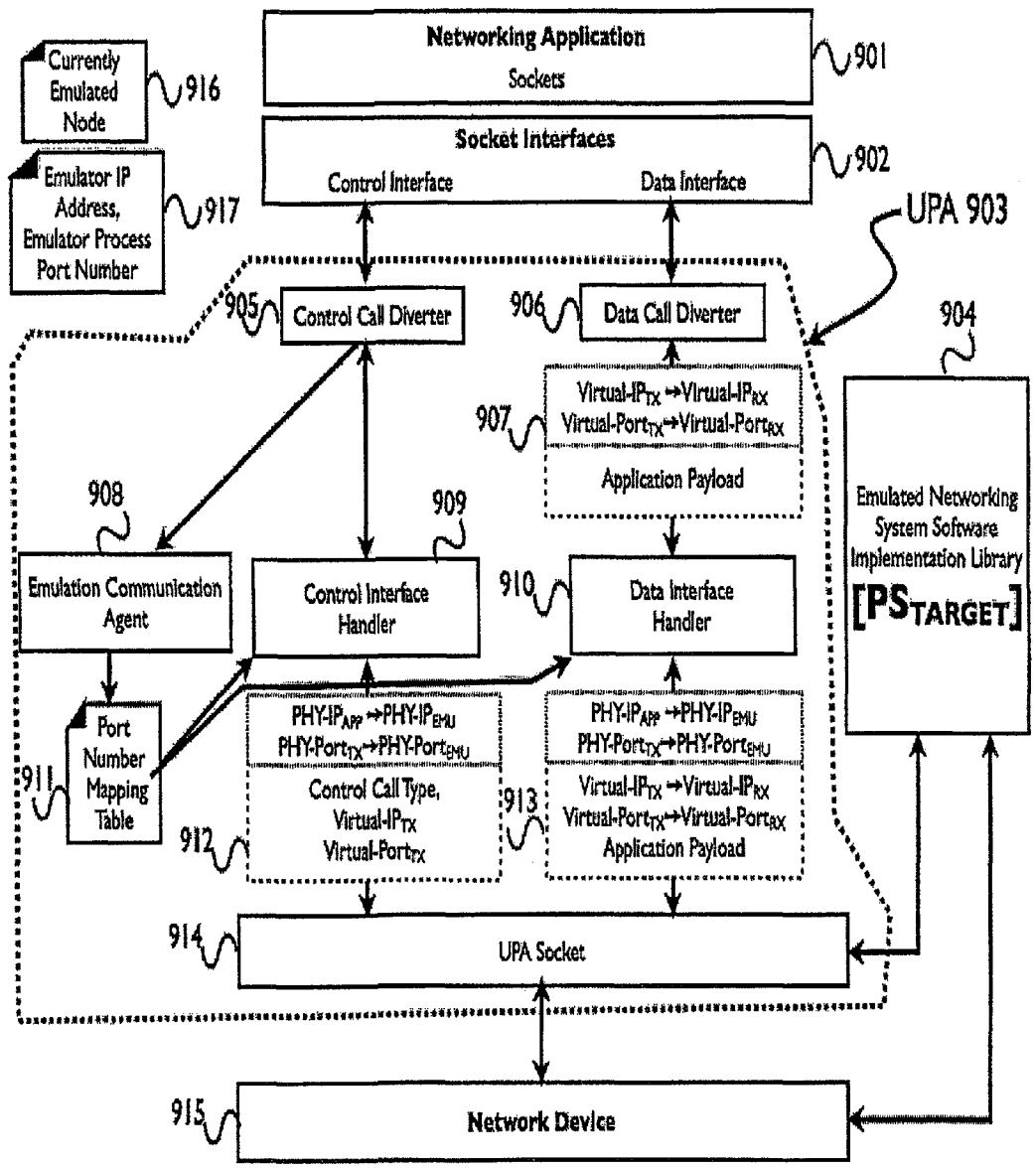
FIG. 9 is a block diagram of a preferred embodiment of a UPA.

Referring now to FIG. 9, UPA 903 may combine elements shown above in FIGS. 3 through 8. The system shown in FIG. 9 includes networking application 901, socket interface 902, UPA library 903, network device 915 and emulated networking system 904. Currently emulated node Id 916 and IP address and port number 917 of emulation process 904 as also shown. The user of the system first sets the IP address and port number 917 through environmental variables and subsequently sets emulated node Id 916 to direct UPA 903 to communicate with that node Id. The user may now launch any networking application 901 that may use sockets to communicate with the outside world.

The sockets in networking application 901 communicate with socket interface 902, via the control interface or the data interface. As mentioned above, UPA 903 intercepts both these interfaces and directs them to UPA 903 library. The data calls are directed to data call diverter 906, while the control calls are directed to control call diverter 905. For each socket that is created by the application 901, UPA library 903 creates a raw socket 914 to communicate with emulation process 904. If emulation process 904 resides on the same machine as the UPA 903, UPA socket 914 can be replaced with any local inter-process communication mechanism. Data call diverter 906 passes along the packet 907 to data interface handler 910. Data interface handler 910 modifies packet 913 and sends it to UPA socket 914.

On the control interface side, control call diverter 905 sends the control message from application 901 either to emulation communication agent 908, if the control message is a request to create a new socket, or to control interface handler 909, for all other control messages. Emulation communication agent 908 creates a new UPA socket 914 and connects to the emulation process 904 using the address stored in IP address and port number 917. Emulation communication agent 908 provides information to emulation process 904, which may include currently emulated node id 916 and the port number from IP address and port number 917. A mapping of the physical address of UPA socket 914 and the virtual socket at the application 901 is kept in port number mapping table 911. For all other control messages, control interface diverter 905 passes the control message to control interface handler 909. Control interface handler 909 creates a new packet 912 that will store all the necessary information related to this control message and sends packet 912 to emulation process 904 using UPA socket 914. Emulation process 904 may also send any data or information to the UPA socket 914 as required.

Figure 10:
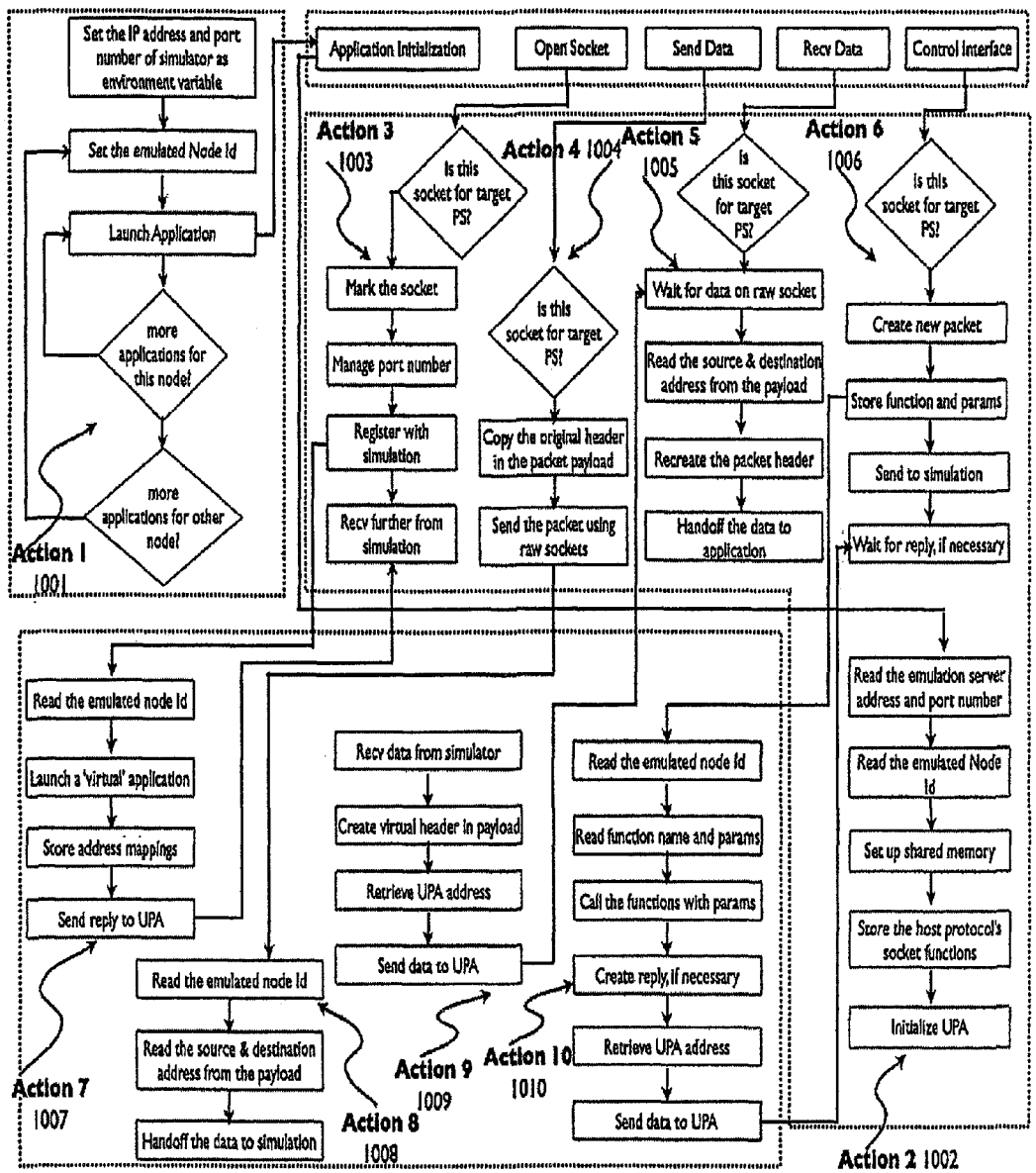
FIG. 10 is a flow chart of a preferred implementation of the tasks involved in the operation a UPA library.

Referring now to FIG. 10, the UPA library may use the following steps for achieving the various tasks discussed above.

Action 1: Launching Applications.
Actor: User.
Steps:
1. Set the IP address and port number of the emulation server process as environment variables 2. Set the emulated node ID.
3. Launch application. [This step will trigger Action 2]
4. If there are more applications to be launched for this emulated node id, then go to step 3.
5. If there are more applications to be launched for other emulated node id, then go to step 2.
6. Done.

Action 2: Load and Prepare the UPA Library after an Application is Launched.
Actor: The UPA Library.
Steps:
1. Read the emulation server address and port number from environment variables
2. Read the emulated node ID from environment variables
3. Set up the shared memory area (for communication with other UPA library instances for applications at the same emulated node)
4. Store the host protocol stack's socket functions (listed in FIG. 7) in a local list
5. Override the above functions with implementations provided in the UPA library
6. Initialize the various data structures
7. Done Action 3: Application Opens a New Socket
Actor: The UPA library
Steps:
1. Check if the type of the new socket corresponds to the emulated protocol stack (ENS).
2. If no, then call the native protocol stack function and mark this socket as "handled by ONS". Go to step 11.
3. If yes, then mark this socket as "handled by ENS".
4. Check if the application has requested a port number. If yes, then assign this port number, else assign a new port number after referring to the shared memory. Refer this port number as P-UPA
5. Create a new raw socket to the emulation server. Refer the port number of this socket as P-RAW.
6. Create a mapping between P-UPA and P-RAW in a table.
7. Send a "registration" message to the emulation server, and provide information on the emulated node ID and P-UPA. [This step will trigger Action 7]
8. Wait for a reply from the emulation server. The reply will contain the "virtual" IP address in the payload.
9. If received reply, then store the "virtual" IP address in the local data structure for this socket and inform application that socket has been successfully created. Go to step 11.
10. If reply is not received after a timeout, or if the reply is malformed or incorrect, then inform application that socket cannot be created.
11. Done.

Action 4: Sending Data.
Actor: UPA library.
Steps:
1. Check if this socket (or file descriptor) is handled by ENS or ONS. If latter, then call the ONS function and go to step 4.
2. Copy the source address, source port number, destination address and destination port number (all of which are "virtual") in the packet payload.
3. Send this payload using the raw socket to the emulation server. [This step will trigger Action 8]
4. Done.

Action 5: Receiving Data.
Actor: UPA Library.
Steps:
1. Check if the socket (or file descriptor) is handled by ENS of ONS. If latter, then call the ONS function and go to step 5.
2. Wait to receive data from the raw socket.
3. After receiving data, read the source address, source port number, destination address and destination port number (all of which are "virtual") from the packet payload and store them in local data structures.
4. Inform the application that data has arrived from the destination with virtual address.
5. Done.

Action 6: Control Functions (See Column 2 in FIG. 7 Above).
Actor: UPA library.
Steps:
1. Check if the socket (or file descriptor) is handled by ENS of ONS. If latter, then call the ONS function and go to step 7.
2. Create a new packet and store the function type and parameters in the packet.
3. Send the packet to emulation server using the raw socket. [This step will trigger Action 10]
4. Wait for response back from the emulation server.
5. If the response is OK, then update the local data structures and inform the application that the function was successful. Go to step 7.
6. If no response was received within a timeout, or if the response was not OK, then inform that application that function was not successful.
7. Done.

Action 7: Handle Registration Message.
Actor: Emulation Server
Steps:
1. Read the virtual port number and emulated node ID from the packet payload.
2. Launch a virtual application in the emulation server with port number same as above. If the application cannot be created, go to step 4.
3. Create and store a mapping between virtual port number/ip address with physical port number and ip address in a table.
4. Create a new packet and store the virtual IP address in the packet payload.
5. Set the status of response as successful or not failure and send the packet. [This step will trigger Action 3, step 8]
6. Done.

Action 8: Send Data.
Actor: Emulation Server
Steps:
1. Read the virtual port number and emulated node ID from the packet payload.
2. Check if there exists a virtual application with this port number on the given port ID. If not, then go to step 4.
3. Remove the virtual header and send the data to the virtual application. The virtual application checks with protocol stack (ENS) should be used for this data packet and calls the corresponding routine for ENS.
4. Done.

Action 9: Receive Data.
Actor: Emulation Server
Steps:
1. The virtual application receives the data from the ENS at the destination host.
2. The source and destination address and port numbers are stored in the packet payload, see FIG. 5, 505.

3. Using the mapping table to retrieve the physical address and port number, see FIG. 5, 511.
4. Send the packet to this physical address and port number, see FIG. 5, 506. [This step will trigger Action 5, Step 2]
6. Done.
Action 10: Handle Function Calls.
Actor: Emulation Server.
Steps:
1. Read the virtual port number and emulated node ID from the packet payload.
2. Read the type of function and parameters from the packet payload.
3. Call this function on the ENS with the provided parameters, and wait for the response.
4. Create a new packet and store the reply from ENS function call in this packet.
5. Using the mapping table to retrieve the physical address and port number by using the virtual address.
6. Send the packet to this physical address and port number. [This step will trigger Action 6, step 4]
7. Done.
B. Universal Device Interface Adaptor (UDIA)

The feasibility and flexibility for development, customization, testing and evaluation of applications and network hardware devices may also be rather restricted or constrained by the network devices.

Any user (such as the protocol stack or the applications) of a networking device typically accesses the device via a data interface—for sending and receiving data packets, and a control interface—for accessing and changing the characteristics or the parameters of the device. Whereas almost all kinds of network device offer similar data interfaces, they typically differ distinctly in the control interfaces provided. This arises from the fact that each kind of network device typically has different device characteristics or attributes, which in turn depends on the specific network technology implemented by the network device. As an example, the attributes of a wireless network device (e.g., WiFi) differ from that of a wired network device (e.g., Ethernet), and relate to changing the transmit power, wireless channel etc. Such are typically therefore relevant only for WiFi networking devices and not Ethernet networking devices. Thus, different kinds of networking devices typically offer access to network attributes via type-specific control interfaces. The actual implementations of these interfaces may be provided.

As noted above, computer simulation is a typically provided by a computer program that simulates an abstract model of a particular system. The simulation is concerned with the abstract model of the system, typically the internal state of the system, and the primary purpose is typically to gain insight into the operations of the system.

Emulation refers to duplication of the functions of one system with a different system, so that the second system behaves like (and appears to other computer components to be) the first system. An emulator may replaces live' physical components of a complex system with counterpart representations that can be deployed rapidly at a fraction of cost. True emulation may be said to be achieved when any player in the system—hardware, software or even humans—can not discern any difference between a real system component and its emulation replacement.

Network emulation is typically a technique where the properties of an existing, planned and/or non-ideal network are modeled with high fidelity operating in real time in order to assess performance, predict the impact of change, or otherwise optimize technology decision-making.

Network emulation typically differs from network simulation in that a network emulator appears to be a network; end-systems such as computers can be attached to the emulator and will behave as if they are attached to a network. Network simulators are typically programs which run on a single computer, take an abstract description of the network traffic (such as a flow arrival process) and yield performance statistics (such as buffer occupancy as a function of time).

Emulation is a viable alternative to physical testbeds that can provide an evaluation framework that is simultaneously accurate, scalable, repeatable, and flexible. The greatest advantage of an emulation may be reduced equipment and labor costs, while the fidelity of the test data between a physical test and an emulated test remains constant. Emulation testbeds are flexible in the sense that changing configurations can be easily done, which would otherwise be very difficult, if not impossible, in physical testbeds. Moreover the experiments are repeatable with controlled parameters to support fair comparison among different system optimization techniques.

Hardware-in-the-loop typically refers to capability of attaching a real hardware platform, such as a physical machine with an operating system, network devices and real applications with an emulated network. The benefit for this approach is for the testing and evaluation of an actual deployment system or physical prototypes in an emulated environment. The boundary line between real and simulation is typically drawn between the networking system software (NSS) and the network device. The NSS and applications are real, whereas the network devices are realized via simulation.

Hardware-in-the-loop emulations are particularly useful for providing the correct (simulated-) network device attributes to the NSS and applications on a real platform.

The problem addressed by the use of a UDIA may be formulated as follows: On a given platform P, aspects of a networking system NS, such as applications or the protocol stack, may requires access to a network device such as $D_{target}$. The techniques disclosed herein are particularly useful in networking systems that require access to both the data as well as the control interfaces of the network device. In such networking systems, it may be desirable to evaluate the performance of the networking system with the device $D_{target}$ and or to develop a component of the networking system for use with the device $D_{target}$ on the platform P.

The device $D_{target}$, however, may not be available on the platform P for various reasons. For example, the device $D_{target}$ may be under development and no implementations are yet available, the device $D_{target}$ may be available but not supported for the platform P, the device is available for the platform P, but is difficult or costly to procure and install, or the purpose of the evaluation is to customize the device properties, and achieving that is difficult or costly on the given platform P.

Other constraints may be that simulation models for the device $D_{target}$ (Sim-$D_{target}$) may be available within a real-time simulation environment or that the physical networking device $D_{host}$ is available on the platform P. Similarly, the networking system might only be available in binary form, should be evaluated with the device Sim-$D_{target}$. That is, source code modification may not be possible or desirable. In a preferred embodiment, networking system should have access to both data as well as control interfaces (as defined above), that is, all of the attributes of the device $D_{target}$ should be accessible by the networking system.

Figure 11:
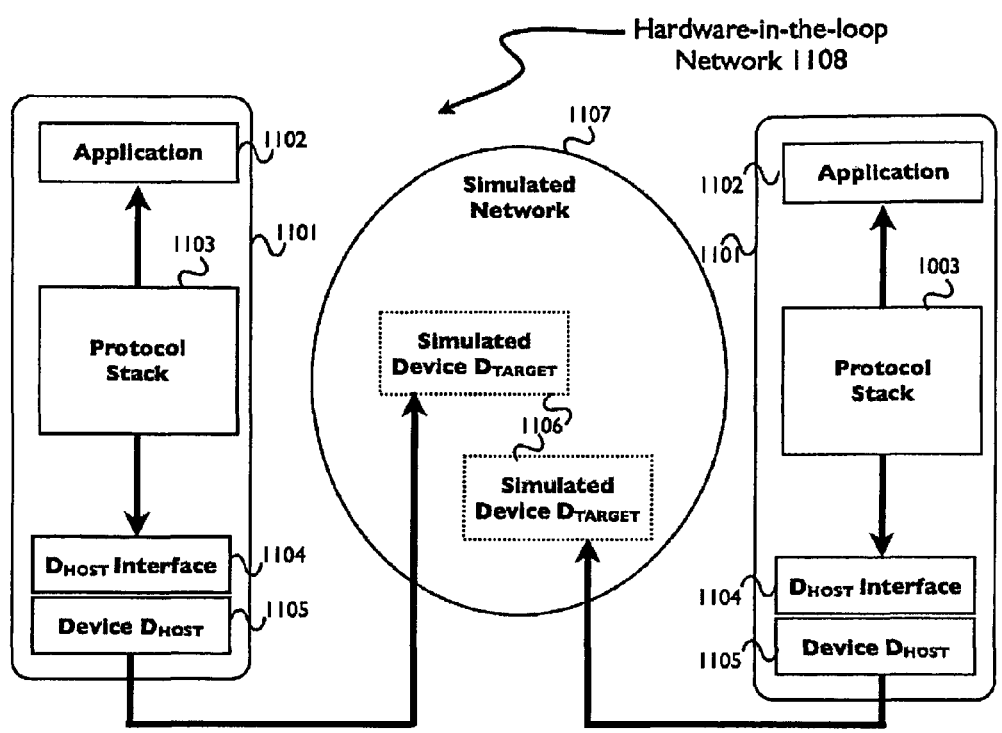
FIG. 11 is a block diagram of an embodiment of a simple hardware in the loop network.

Referring first to FIG. 11, the conventional architectures and concepts of a hardware-in-the-loop emulation may be illustrated in that application 1102 and the protocol stack $PS_{host}$ 1103 are part of the hardware-in-the-loop emulation 1108 that connects physical platform 1101 with an simulated network 1107.

The emulation of a network device requires that the protocol stack 1103 and the application 1102 use a simulation model of a target device, $D_{target}$ 1106. However, in conventional approaches, the physical network device $D_{host}$, $PS_{host}$ 1105 may be used for communication with the simulator network 1107. However, physical $D_{host}$ 1105, and simulated $D_{target}$ 1106 are different, and may be incompatible. As a result, even if the data interfaces of a simulated network device $D_{target}$ 1106 are correctly provided to the physical host platform 1101; the device attributes 1104 that are made available to protocol stack 1103 and applications 1102 are, however those of $D_{host}$ 1105 instead of those of $D_{target}$ 1106, which are the required attributes.

A conventional system would therefore not support the control interfaces for device $D_{target}$ 1106. That is, networking system 1101 would not have access to the device specific capabilities or attributes available in Sim-$D_{target}$. Even if the control interfaces for $D_{target}$ 1106 and $D_{host}$ 1105 are identical, attempts to control the configuration or attributes on device $D_{host}$ 1105 would typically modify device $D_{host}$ 1105 and would not likely be reflected at Sim-$D_{target}$ 1106.

Similarly, when the capabilities differ, the correct attributes of $D_{target}$ may not be provided at all. While it is possible in some situations to create a custom interface to "tunnel" the device control calls to the simulator, this approach would require modifications to the source code of the application and would not be acceptable in situations where such modifications to the source code were not desirable or possible. As a result, off-the-shelf networking systems could not be used.

Referring now generally to FIGS. 11-16, a Universal Device Interface Adaptor (UDIA) is disclosed which provides both data and control interfaces between a networking system on one end, and a simulated network device at the other. In a hardware-in-the-loop configuration in which access to the control attributes of a simulated networking are desirable or necessary, communications with the simulated network device are performed by using a virtual counterpart of the simulated networking device on the physical platform.

The UDIA provides the capability for supporting the device attributes (e.g. via the control interface) for any kind of networking device. It is, in essence, a universal adaptor that can be fitted with attributes of any device. In the example shown in the figure, the UDIA provides the control interface (that is the properties and attributes) of the $D_{target}$ device. For some other scenario that requires a different emulated device, the control interface can be suitably replaced for that specific device.

The actual implementation of the emulated device is available as a simulation model on a networked platform which hosts the simulation process. Thus, even though the communication is happening on the physical $D_{host}$ device, the protocol stack and applications will only be aware that they are using the $D_{target}$ device. The virtual device can be easily configured to provide the capabilities, that is, the control interfaces of any desired network device.

In particular, techniques are provided for emulating a networking device (e.g. a WiFi device) using a, perhaps completely different, real networking device (e.g. Ethernet device). The virtual or emulated networking device (UDIA) interfaces the networking system and applications in a physical system with the simulation models of that device in a simulated environment for channel and mobility. This interface is provided for both the data channels (transfer of data and data related APIs) and the control channels (setting the properties or attributes of the device itself). Any change in the emulated device status by any component in the physical system is effectively reflected in the simulation process, and similarly any effect within the simulation is reflected to the physical components that use the emulated device.

The result, therefore, provides on-demand and dynamically, single or multiple instances of a UDIA on a physical device in a manner that does not compromise the programming interfaces (APIs) and application binary interface (ABI) compatibility of the entire system, is transparent and independent of the underlying OS and provides functional transparency to the users of the UDIA. The following desirable objectives may be achieved in one or more preferred embodiments.

Application Programming Interface (API) Compatibility: The emulated device should export the same APIs as that of a real device. Any application, service or protocol developed for a real network device should work seamlessly with the emulated devices. That is, the UDIA should masquerade as a real device to the users, the applications and the protocol stack.

Application Binary Interface (ABI) Compatibility: Any existing application or protocol that was developed for a physical device should work seamlessly with the UDIA. That is, there should be no need for access to the source code for modifications, recompilations and/or relinking into the END. In other words, the same binary application or library should work for both physical and emulated devices.

Perceptual Transparency: The end-users, the applications as well as the protocol stack should not be able to perceive any differences in performance between a real device and an emulated one.

Multiple Instances of UDIA: The system should provide the ability to run multiple instances of the networking system software. The implementation itself may be either by running multiple processes for each instance, or running single instance that (de)multiplexing different calls within this instance.

Operating System Transparency: No additional support or feature from the Operating System should be required for development, installation and usage of the UDIA, more than what exists in the standard distribution versions. As an example, for commercial closed-source OS there should be no requirements for the access to the source code.

Operating System Independence: The development and customization environment in UDIA should not require any domain knowledge of any specific operating system. That is, the framework should be portable to all the platforms that it supports.

Hot-Pluggable: The UDIA system should not require recompiling the kernel and/or restarting the machine in order to be installed, uninstalled or used.

Co-existence with Physical Device: It should be possible that both the physical and the emulated devices exist simultaneously. That is, some applications may chose to communicate using emulated device while others use the physical one.

Support Cross Layer Interactions (CLI): The UDIA should support cross layer interactions between the applications and networking system software, and between applications and network devices in ways more advanced and flexible than what is possible with a physical.

Flexible Execution Environment: The simulation models for the UDIA should be able to run on the same machine in which the application is running or alternatively on a remote server.

Should not compromise the security, stability and fidelity of the operating system as a whole.

Some or all of the following desirable benefits may be provided in one or more preferred embodiments. Any machine with an emulated device for the target network should appear to the users, the applications and the protocol stack as if it is deployed in the target network. This platform can be used for purposes of development, validation, test & evaluation, training etc. This emulated platform may be useful for those components of the network under test that are either difficult or costly to deploy (e.g. airborne networks), the technology for which is not currently available (e.g. JTRS) or the intended channel environments cannot be produced easily (e.g. channel conditions in rain).

The virtual network device for simulation presents a real networking stack with an interface to a scenario existing in a simulation. It allows the user the flexibility to test real world applications and transport and routing layers first on a simulation scenario through the virtual network device for simulation and then swap the virtual network device with a real network device once the performance of the applications and the protocol stack is deemed satisfactory. This provides an efficient mechanism for protocol stack validation and testing.

The radio drivers (Medium access layer etc) can be implemented within a simulator framework, which provide an easy and platform-independent environment for such development or evaluation. Testbeds with real devices typically require extensive domain knowledge creation and modification of kernel device drivers and firmware programming to implement radio drivers.

The radio hardware as well as the communication channel can be modeled as simulations. This allows scalability, repeatability, controllability and ease in analysis.

Low cost test-beds: Physical testbeds are expensive and difficult to set up and maintain. Configurations such as mobility in a freeway for a vehicular network are not only difficult to realize but also nearly impossible to repeat. These testbeds cannot be as rich as simulation in creating diverse scenarios or providing varied input conditions. Emulation offers a viable alternative to the preceding shortcoming. A cluster of devices can be connected with each other via the emulated network devices, and the radio and channel can be configured easily within the simulation environment in a repeatable and controllable fashion.

Futuristic technologies: A physical test-bed or a development environment cannot typically accommodate futuristic designs of networking hardware, especially if the implementations of which are either not currently available or difficult to procure (e.g. JTRS technology, Cognitive radio, UWB and so on).

A small-scale test-bed can be extended by components of the same technologies to addresses the scalability limitations of the physical test-beds.

Emulation may be used to bridges the gap between development, evaluation and deployment.

Scripts and applications that are used to set up and configure a physical wireless network will typically work seamlessly in this emulated network. For example, the emulated virtual device will typically allow setting up a network in infrastructure/ad-hoc mode, setting the SSID, Tx power level, data rate adaptation methods etc.

Recent advances in protocol stack design have led to a new concept of stack design: cross layer protocol stacks, where control information is shared across layers so that performance of the stack on the whole can be optimized based on individual layer performance; a feature which was denied in the conventional OSI Layer approach for stack design. These cross layered stacks allow the layers to get as well as set other layer parameters for achieving optimized performance. The virtual network device for simulation may provides an ideal environment for the development of cross layered protocol stacks by allowing the real world protocol layers to get and set parameters for the virtual network device which in turn are reflected in the simulation scenario. An example is power aware routing protocols that change the transmit power of the radio to improve performance metrics. With the virtual device, the routing protocols do not need to be modified, they will work seamlessly with a real or virtual network device.

Protocols or applications that monitor the network device need not be modified. Examples include tcpdump for packet capture (along with enabling/disabling promiscuous mode etc), ethereal, airopeek etc applications that monitor the channel signal strength, as well as other network diagnosis applications.

Referring now to FIG. 11, a hardware-in-the-loop network 1108 may include physical hosts 1101 and a network simulator 1107. The physical host 1101 may include applications 1102, protocol stack 1103, $D_{host}$ device interface 1104 and the physical device 1105. The simulator 1107 may include simulation models of the device $D_{target}$ 1006. It is intended that the application 1102 and the protocol stack 1103 operate over the $D_{target}$ device 1006.

In operation as shown, the application 1102 and protocol stack 1103 want to use the $D_{target}$ 1106, but have access to the device interface for $D_{host}$ 1104 only. This may be a particular problem if the two devices 1105 and 1106 are not mutually compatible. The application 1102 and protocol stack 1103 in this case would not be able to access and use the attributes of the device $D_{target}$ 1106. Even if devices 1105 and 1106 are compatible with each other, the application 1102 and protocol stack 1103 may access the device attributes through the interface 1104 but these attributes will belong to the $D_{host}$ device 1105 and not the correct device $D_{target}$. Similarly, the application 1102 and protocol stack 1103 may change a device attribute through the interface 1104, but these attributes will be changed for the device $D_{host}$ 1105 and not to the correct device $D_{target}$ 1106. Such problems could either lead to inapplicability of the hardware-in-the-loop network 1108 for many use cases or to incorrect analysis of the application 1102 or protocol stack 1103.

Figure 12:
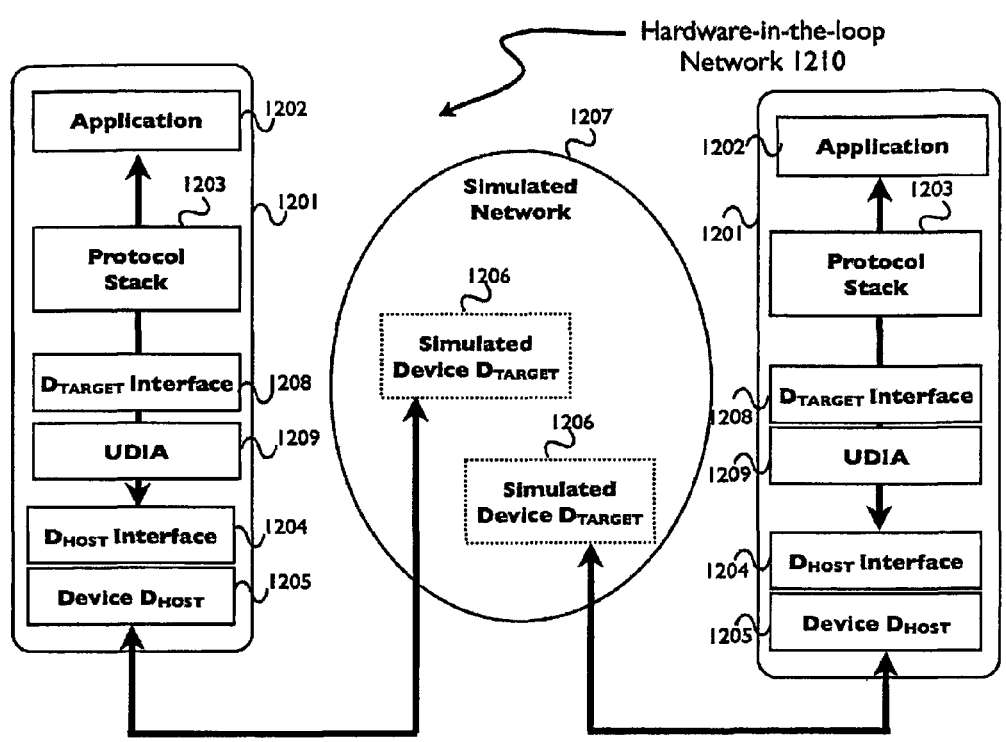
FIG. 12 is a block diagram of a preferred hardware in the loop network.

Referring now to FIG. 12, an improved the hardware-in-the-loop network 1210 may include physical hosts 1201 and a network simulator 1207. The physical host 1201 may include application 1202, protocol stack 1203, device $D_{target}$ interface 1208, UDIA 1209, device $D_{host}$ interface 1204 and the physical networking device $D_{host}$ 1205. The simulated network 1207 may include simulation models of the device $D_{target}$ 1206. In this hardware-in-the-loop network 1210, the UDIA 1209 pretends to the application 1202 and the protocol stack 1203 that the attributes of the device $D_{target}$ are available on the physical host 1201 through the $D_{target}$ interface 1208.

Thus, application 1202 and protocol stack 1203 may access correctly the device $D_{target}$ 1206 in simulator 1207, even if the devices $D_{target}$ 1206 and $D_{host}$ 1205 are mutually incompatible. Furthermore, application 1202 and protocol stack 1203 may access the device attributes of $D_{target}$ 1206 via the $D_{target}$ interface 1208. The UDIA 1209 retrieves the correct attributes of the simulated device $D_{target}$ 1206 from the simulator 1207 and thus is able to pretend that the device $D_{target}$ is available on the physical host 1201. Similarly, application 1202 and protocol stack 1203 may modify the device attributes of the device $D_{target}$ via the $D_{target}$ interface 1208. The UDIA 1209 communicates this information to the simulated device $D_{target}$ 1206 in the simulator 1207 and thus is able to pretend that the device $D_{target}$ is available on the physical host 1201.

In a preferred implementation of the UDIA, the UDIA 1209 may be implemented as a network device driver module that operates as a layer between the protocol stack 1203 and the device $D_{host}$ 1205. The operating systems that supports network communications provide mechanisms for developing, installing and using device drivers for the communication hardware (Network interface cards such as Ethernet controllers or wireless radios). The upper half of the driver is configured to communicates with the protocol stack while the lower half is configured to communicates with the actual hardware.

The UDIA 1209 may be implemented as a module that can be loaded into the operating system in the standard Software Development Kit (SDK) environment available in the specific platform (in case of Linux, the UDIA may be implemented as kernel modules; in case of Windows, as NDIS drivers). The upper half of the UDIA 1209, therefore, provides the same interface as a real device, by virtue of which it is able to masquerade as a real device. The egress traffic from the applications 1202 and the protocol stack 1203 will reach UDIA 1209.

The lower half of the UDIA 1209, however, deviates from the conventional driver implementation, as there is no actual hardware that is used for communication. The lower half of UDIA 1209 is configured to communicate with another driver of a physical device $D_{host}$ 1205.

When the UDIA 1209 is loaded in the host system 1201, it will unregister the protocol stack 1203 handler from the physical device driver 1205 and announce itself as the handler. In this way, the packets that arrive on this host 1201 and received by the physical device driver 1205 will be handed off to the UDIA 1209 before they can be fed into the protocol stack 1203.

Figure 13:
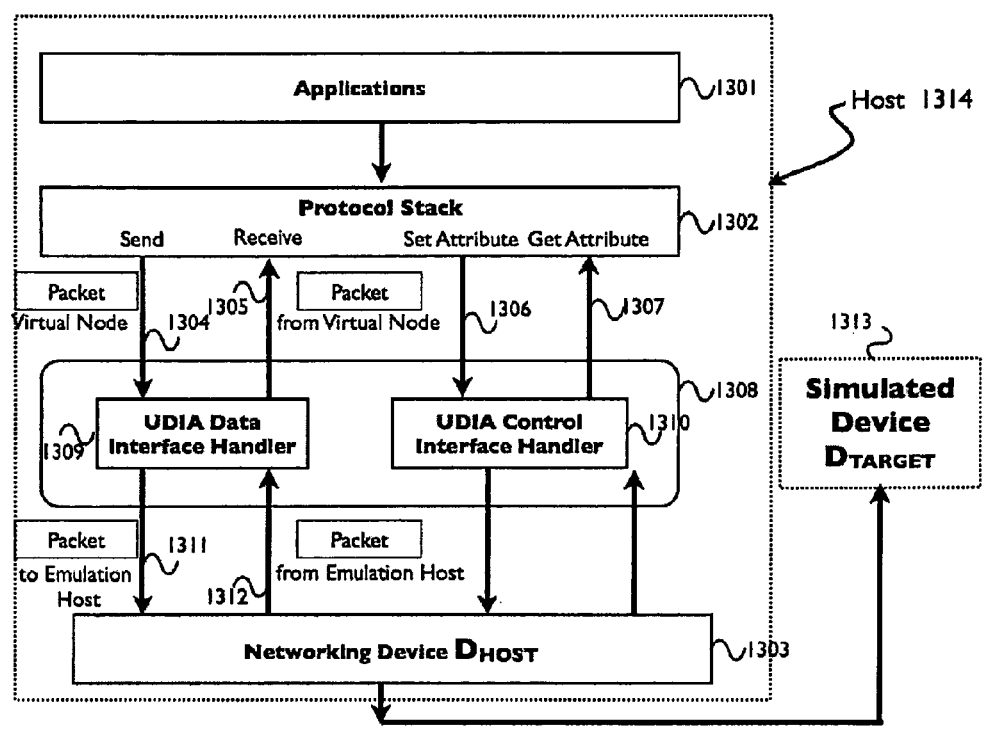
FIG. 13 is a block diagram of a preferred embodiment of a UDIA operating in a host to support a simulated device $D_{target}$.

Referring now to FIG. 13, the physical host 1314 may consist of application 1301, protocol stack 1302, UDIA 1308 and the physical device $D_{host}$ 1303. A simulator consisting of the device $D_{target}$ 1313 is running at some other machine.

The UDIA 1308 provides two kinds of interfaces to the protocol stack 1302 and application 1301: Data Interface Handler 1309 and Control Interface Handler 1310. The data interface 1309 is responsible for transfer of data between the application 1301 and simulated device 1313, while the control interface 1310 is responsible for providing access to read and set the simulated device 1313 attributes and parameters, that is, interfaces not related with data transfer.

The Data Interface handler 1309 provides two key interfaces: sending packets 1304 and receiving packets 1305. Applications send out data 1304 assuming that the device underneath is the $D_{target}$, and the data handler 1309 transforms this packet into a format 1311 that is compatible with the $D_{host}$ 1303. Similarly, data 1312 arriving from the $D_{host}$ 1303 is modified to a format 1305 such that applications believe that it is arriving from the Dtarget device 1303.

The Control Interface hander 1310 also provides two key functionalities: 'Get' Device attributes 1306 and 'Set' Device attributes 1307. The application 1301 or protocol stack 1302 may read the current device status of the device via function calls 1306 or set those to new values 1307 again via function calls.

UDIA 1308 is only a front-end for these interfaces, all data calls and functions are ultimately delivered to the simulation device within the simulator 1313.

As noted earlier, the actual implementation of the device $D_{target}$ is available within a real time simulator 1313 that executes as a user-level process on a remote machine. After the UDIA 1308 is loaded, it need to register itself with the remote server 1313. The simulation server 1313 may periodically announce itself via a broadcast message of its availability and announce the port number for the simulation process 1313. Alternatively, the IP address of the machine and the port number of the simulation process 1313 can be configured in the UDIA 1308 manually. In either case, the UDIA 1308 will create a UDP packet and send its information to the simulation process 1313. This packet will contain the IP address of the emulated device $D_{target}$ and send it over the physical device 1303. The simulator 1313 upon receiving the packet will know the emulated IP address as well as the IP address of the physical device 1303 and it will maintain a mapping of these two addresses in a lookup table.

Referring now to FIG. 12, as well as FIG. 13, the data interface handler 1309 must satisfy the following requirements for correct operation of the hardware-in-the-loop network 1208.

There are no actual hardware associated with the $D_{target}$ 1313, hence there will be no link layer addresses (as those are defined by the hardware). This will create issues, among other things, with regard to the ARP module that maintains a mapping between the IP addresses and the link layer addresses.

When two physical hosts 1201 are on the same LAN, these two nodes should not be able to communicate with each other directly. All communications between these nodes should go through another machine that is running the simulation process 1207.

Both the considerations made above must be hidden from the applications 1202 and the protocol stack 1203. That is, the application 1202 and protocol stack 1203 should be able to use the IP addresses of the emulated device just as they would for a real device. This requires that between the application 1201 and the upper half of the UDIA 1209 the IP address of the physical device 1205 must not be visible and, at the same time, between the lower half of the UDIA 1209 and the physical device 1205, the IP address of the emulated interface should not be visible.

Figure 14:
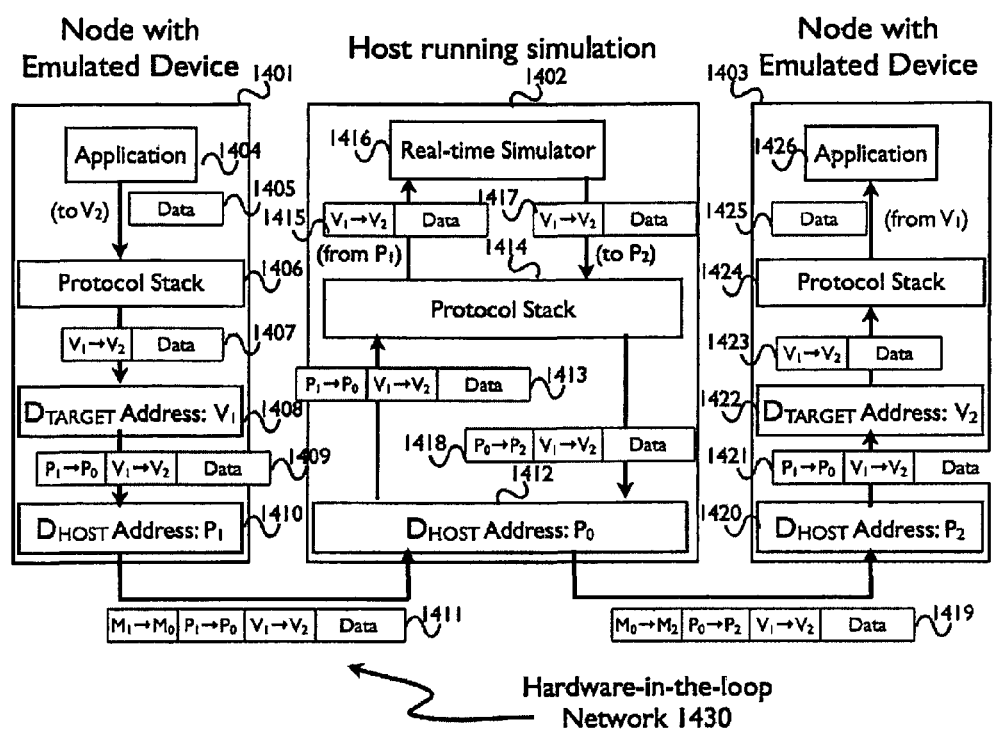
FIG. 14 is block diagram of an improved embodiment of a hardware in the loop network.

Referring now to FIG. 14, the operation of the data interface 1309 in FIG. 13 is described in greater detail. The hardware-in-the-loop network 1430 may include two physical hosts 1401 and 1403, and also a third machine 1402 that is running a real time simulator 1416 as a user-level process. The emulated devices on the two machines have IP addresses of V1 and V2 (1408 and 1422, respectively). These emulated devices will actually use the physical network devices ($D_{host}$) (1410, 1412 and 1420) for communication, and the IP address of these are P1 and P2 respectively. The IP address of the simulation machine is P0. The corresponding link layer addresses are M1, M2 and M0.

The sender application 1404 on the physical host 1401 will generate data 1405 and request the protocol stack 1406 to send to the IP address V2. Note that that application 1404 communicates assuming that the address V2 is a real one. The protocol stack 1406 will add the transport and IP layer headers to the data. The IP header of the packet 1407 will contain V1 as the source address and V2 as the destination address. Again, note that the protocol stack 1406 still operates assuming that the addresses V1 and V2 are real. The protocol stack 1406 will finally deliver the packet to the UDIA 1408.

UDIA 1408 upon receiving the packet 1405 from the protocol stack 1406 will remove the transport and IP headers and place them in the data segment of the packet 1409. It will subsequently create new transport and IP headers. The transport header will be a UDP header that will contain the port number of the simulation process 1416 as the destination port number. The IP header will have P1 1410 as the source address and P0 1412 (the simulation machine) as the destination address. UDIA 1408 will handoff this modified packet 1409 to the driver of the physical device 1410.

The physical device 1410 will look at the IP header of the packet 1409 and assume that the protocol stack 1406 wants to send data to the simulation machine 1402. The device 1410 will invoke the ARP protocol to find the link layer address of the P0 1412 or look up from the ARP table if the protocol has already been invoked. Note that this ARP communication happens for the physical devices for which link layer addresses exist. The physical device 1410 will then transmit this packet 1411 to the simulation server 1402.

At the host running simulation 1402, the packet 1411 will appear to be coming from the physical interface 1412. That is, the protocol stack 1414 in the simulation machine 1402 will not be aware of the virtual interfaces. When the data 1415 reaches the simulation process 1416, the latter will parse through the data segment to read the original IP and transport header. The IP address information is used to model the communication between the two nodes in the simulation environment 1416.

When the simulation process 1416 decides that the node that has the virtual IP address V2 should receive a packet, it will encapsulate the data as well as the original headers in the data segment 1417 and ask the protocol stack 1414 to deliver to P2 1420. Recall, at time of installation of the UDIA 1408 and UDIA 1422, an entry was added at the simulation process 1416 that maps the virtual address to the physical address. The packet 1419 will be delivered over the physical address to the destination machine 1403.

When the driver of the physical interface 1420 receives the packet, it will deliver the packet 1421 that to the UDIA 1422 since the latter has announced itself as the default handler of all IP packets. UDIA 1422 will strip out the IP and transport headers in the packet 1421, and move the original headers contained in the data segment into the respective place and deliver this new packet 1423 to the protocol stack 1424. In this way, the protocol stack 1424 will see the packet 1423 as if it is coming from the emulated network device. The actual data 1425 can then be delivered to the receiver application 1426.

Figure 15:
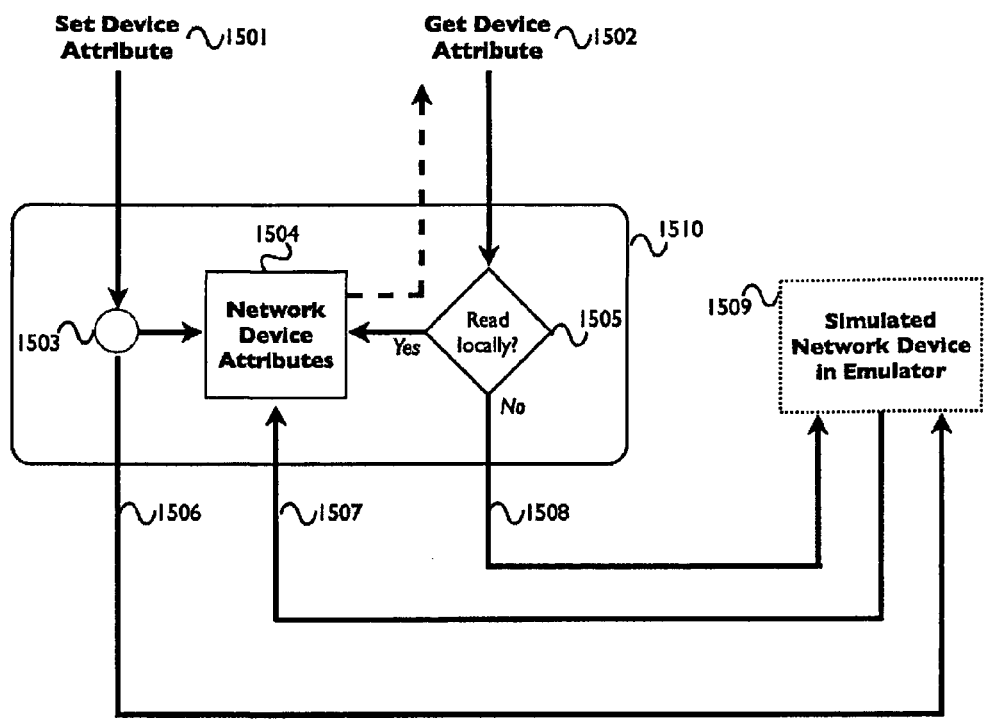
FIG. 15 is a flow chart of the operation of a simulated network device in an emulator.

Referring now to FIG. 15, and FIG. 13, the operation of control interface handler 1310 described. As mentioned earlier, the interface handler 1510 is required to provide two key interfaces: Setting the device attributes 1510 and reading those attributes 1502. When the device attributes are set by any user, two copies of the new values are made 1503; one value is store locally in the Network Device Attributes Table 1504 while the second copy 1506 is sent to the Emulation process 1509 where the characteristics of the simulated device can be suitably modified.

When any application 1301 wants to read the current value of any device attribute, the control interface handler 1510 first decides, at decision block 1505, whether the request can be answered from the local Device Attributes Table 1504. The rules for making this decision depend on the nature of the device and as such are configurable by the implementer of the device $D_{target}$ interface within UDIA 1308. If the request can be answered locally, the function call returns immediately with the values from the table 1504. In case the request cannot be answered locally, the control interface handler blocks the requesting application 1301 and forwards the request 1508 to the simulated device 1509. The simulated device 1509 then provides response 1507 with the current values of the device attributes, which are returned to the requester of the information, as well as stored in the local device attributes table 1504. The simulated device 1509 can also chose to inform the control interface handler regarding any change in the device attributes even if it is not explicitly requested to do so. These information are stored directly in the table 1504 and help in keeping it up-to-date.

The following paragraphs review some of the mechanisms and approaches adopted in a preferred embodiment of a hardware-in-the-loop network simulation.

The UDIA module is implemented as a network device module such as a loadable kernel module in Linux, NDIS driver in Windows or Kernel Extensions in Mac OSX. The operating system and applications will, therefore, think that there is a physical networking device available to be used and that it can be accessed via the UDIA driver.

The UDIA driver module exports the attributes, that is, the interfaces of the Dtarget—Therefore, the OS and the applications will think that the networking device accessed via UDIA is actually the device of type $D_{target}$.

After the UDIA module is loaded and assigned a virtual network address, the UDIA will register itself with the emulation server process. This registration message will contain both the virtual address and physical addresses. The emulation server will, therefore, having a mapping between the virtual and physical mapping, which will be used later on to direct the outgoing packets from the emulation server to the correct physical host.

When the UDIA is requested to transmit a data packet, it will send the packet using the driver of the device $D_{host}$. However, before doing that, the UDIA driver will convert the packet, if necessary, to a format that is compatible with the device $D_{host}$. Therefore, even though $D_{host}$ is utilized for transmission of packets, it remains absolutely opaque to the users of the UDIA, e.g. the OS and applications.

The UDIA module, upon loading will unregister the protocol stack from the $D_{host}$ device driver. That is, the UDIA driver will inform that the part of operating system, such as the protocol stack, that previously used to handle all incoming packets is no longer available. Instead, the UDIA announces itself to be the default handler for all incoming packets. As a result the $D_{host}$ driver, upon receiving packets, will deliver them to the UDIA driver. This is necessary since the UDIA driver does not operate over a hardware over which it can receive packets. However, by following the list of steps as outlined, the UDIA driver is able to receive all incoming packets that are destined for this particular node.

When the UDIA driver is requested to send out a packet, it will modify the structure of the packet headers and the payload. Recall that the headers in these packets will contain "virtual" addresses and that there are no physical machines in the local subnet that have these addresses. To ensure seamless communication, the UDIA driver moves the actual packet header in the packet payload and creates new headers. These new headers will contain the physical addresses of the local machine (the $D_{host}$ device) and the machine that hosts the emulation server.

When the UDIA driver receives a packet it will again modify the structure of the packet headers and the payload. Recall that the headers in these packets will contain the "physical" addresses. The UDIA driver removes these headers and moves the virtual headers that were stored in the packet payload as the header for the packet. This way, any piece of software (applications or protocol stack) that use the virtual $D_{target}$ device will think that the packet is coming from the virtual address.

When any application or a component of the operating system accesses the device attribute interface of the $D_{target}$, either to set a value or to get the value, the UDIA driver will be responsible for handling such requests. When setting a value the UDIA will create a packet that will contain the attributes whose value is set and the new value, and send this packet to the emulation server. When a value of an attribute is requested, the UDIA driver will create a packet that will contain the name of the attribute and send it to the emulation server. The UDIA driver will then wait for a response from the emulation server. This response will contain the value of the attribute which will be returned to the requesting process.

The above steps can be optimized by maintaining a cache at the UDIA driver. When a value of an attribute is requested, the UDIA will first consult the cache and identify if the request can be satisfied locally from the cache. If this is the case, then the UDIA driver will reply immediately from the cache, otherwise it will follow the steps as outlined above. The cache is populated by three events: when a value of an attribute is set then this value is stored in the cache; when a value of an attribute is requested from the emulation server, the reply is stored in the cache; and when the emulation server send a gratuitous message to inform a change in value of some attribute, the value is also stored in the cache.

The emulation server is responsible for following actions:

It periodically broadcasts in the local subnet, the IP address and the port number of the emulation server process. This is beneficial for newly loaded UDIA drivers to identify the location and address of the emulation server, without the need for explicitly configured by the user.

The emulation server will continuously listen for incoming data packets. Upon reception of data packets, the server will extract the virtual header from the packet payload and feed it into the emulation process.

The emulation server will continuously listen for attribute value requests. Upon reception of such requests, the server will consult the emulation process to retrieve the value and send it back to the originating requestor via a data packet.

The emulation server will send an outgoing packet to an UDIA driver. This packet will contain the virtual headers as the packet payload.

The emulation server will continuously monitor if any attribute of the emulated device is changed. If they do, then the server will create a gratuitous packet and send this information to the relevant UDIA driver so that this new value can be updated in the cache.

Figure 16:
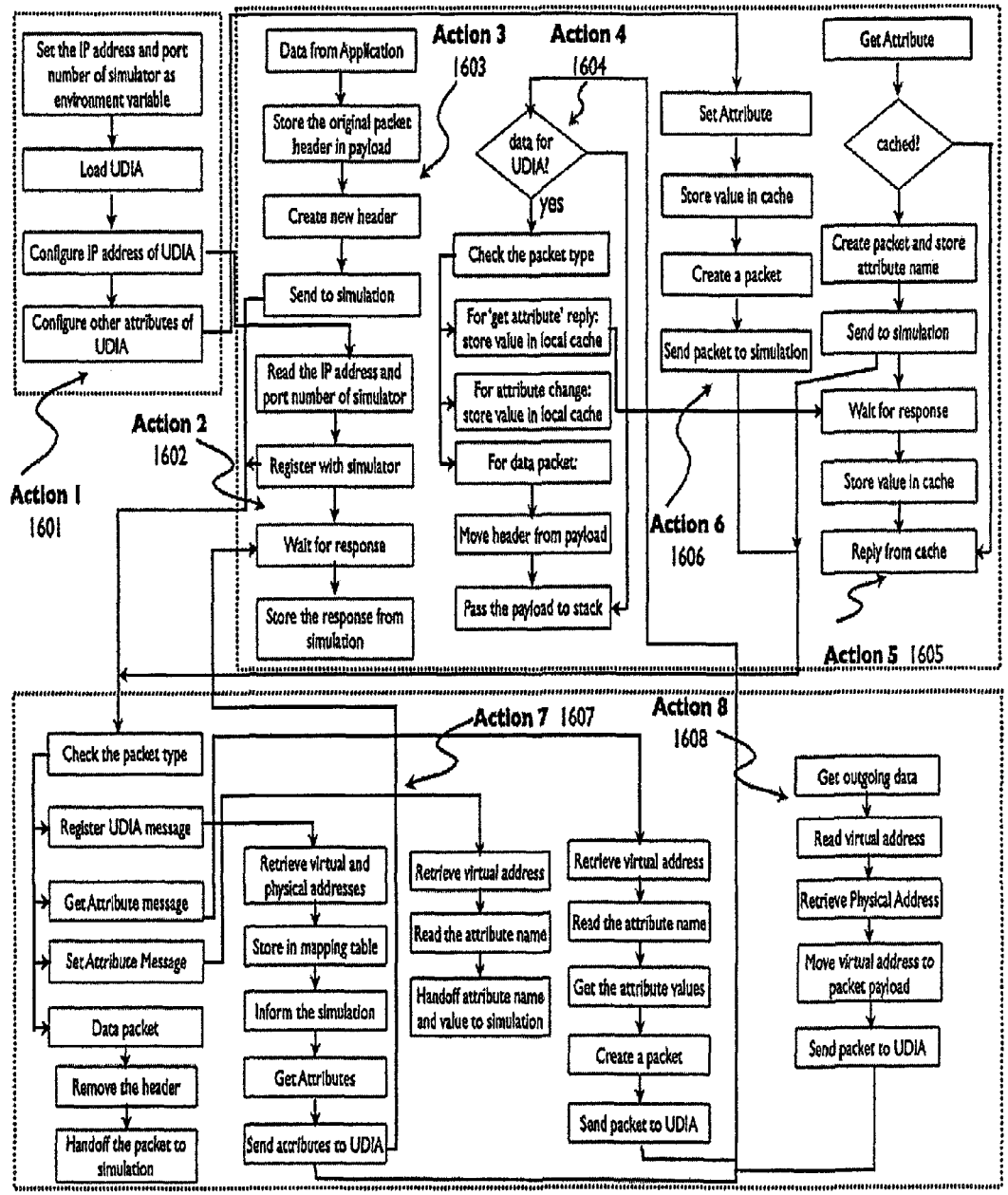
FIG. 16 is a flow chart of a preferred implementation of the tasks involved in the operation a UDIA device.

Referring now to FIG. 16, the emulation server may use the following steps for achieving the various tasks discussed above.

Action 1: Loading and Configuring the UDIA.
Actor: User
Steps:
1. [Optional] The user configures the IP address and port number of the emulation server process as environment variables.
2. The user will load the UDIA module. The user will configure the IP address of the device. [This step will trigger Action 2]
3. [Optional] The user will configure other attributes of the $D_{target}$ device. [This step will trigger Action 6]
4. Done.

Action 2: Registering UDIA with Emulation Server.
Actor: UDIA
Steps:
1. UDIA will try to read the IP address and port number of the emulation from the environment variables. If this information is available, go to step 3.
2. UDIA will wait for broadcast messages from emulation server that announces the address and port number. If no such message is received within a specified time interval, inform the user that the UDIA failed to load and go to step 7.
3. Send a registration message to the emulation server process. The message will contain the virtual address and the physical address. [This step will trigger Action 7, Step 3]
4. Wait for the response from the emulation server.
5. If the response is not received within the specified interval, then inform the user that the UDIA failed to load and go to step 7.
6. The response will contain tuples of <device attribute name, device attribute value>. Store these in the local cache.
7. Done.

Action 3: Sending Data Packet.
Actor: UDIA
Steps:
1. Create extra space in the packet payload and store the packet header (containing the "virtual" addresses).
2. Create a new packet header that will contain the physical addresses of the Dhost and the emulation server.
3. Handoff the packet to the Dhost driver. [This step will trigger Action 7, Step 9]
4. Done.

Action 4: Receiving Data Packets from the $D_{host}$ Driver.
Actor: UDIA
Steps:
1. Check if the packet belong to the virtual device. If no, then pass the packet to the protocol stack and go to step 5.
2. Check the type of this packet.
3. If it is a reply to a "get attribute" request, then store the value in the cache and return the value to the original requestor. Go to step 8.
4. If it is a gratuitous message from the emulation server informing a change of value of some attribute, then store the value in the cache. Go to step 8.
5. Remove the packet header (containing the physical addresses).
6. Move the virtual header that was part of the packet payload and make that as the packet header.
7. Pass this packet to the protocol stack.
8. Done.

Action 5: Get the Value of an Attribute.
Actor: UDIA
Steps:
1. Check if the value is available in the cache. If it is, then reply from the cache. Go to step 8.
2. Create a packet and store the name of the attribute in the packet.
3. Handoff the packet to the $D_{host}$ driver to be transmitted to the emulation server. [This step will trigger Action 7, Step 13]
4. Wait for a response from the emulation server.
5. If a reply is not received within a specified time interval then inform the originating requestor that the value is not available. Go to step 8.
6. Store the returned value in the cache.
7. Return the value to the originating requestor.
8. Done.

Action 6: Set the Value of an Attribute.
Actor: UDIA
Steps:
1. Store the value in the cache.
2. Create a packet and store in it the name of the attribute and the new value.

3. Handoff the packet to the $D_{host}$ driver to be sent off to the emulation server. [This step will trigger Action 7, Step 11]
4. Done.

Action 7: Receive Packets from the UDIA.
Actor: Emulation Server.
Steps:
1. Check the type of the packet.
2. If the packet is a registration message go to step 3, if it is data packet go to step 9, if it is "set attribute" go to step 11, if it is "get attribute value message go to step 13.
3. Retrieve the virtual and physical address from the packet.
4. Store the two addresses in a mapping table.
5. Inform the emulation process that the emulation device that corresponds to the virtual address is to be configured.
6. Get the list of the attribute names and values from this emulated device.
7. Create a data packet and send the above information to the UDIA. [This step will trigger Action 2, Step 6]
8. Go to step 16.
9. Retrieve the virtual header from the packet payload.
10. Inform that emulated device that corresponds to the virtual address that the packet is to be transmitted from this device. Go to step 16.
11. Retrieve the virtual address of the UDIA node, the name of the attribute and the value from the packet.
12. Inform the emulated device that corresponds to the virtual address that the value of the attribute has been changed. Go the step 16.
13. Retrieve the virtual address of the UDIA node and the name of the attribute.
14. Retrieve the value of the attribute from the emulated device.
15. Create a packet and send this information to the UDIA node. [This step will trigger Action 5, Step 6]
16. Done.

Action 8: Send Packet to the UDIA. Actor: Emulation Server.
Steps:
1. Check the type of the packet. If it is a data packet go to step 2, if it is the reply message to "get attribute" request or the gratuitous attribute value message go to step 4.
2. Create extra space in the packet payload and store the virtual header as part of the payload.
3. Go to step 5.
4. Create a packet and store in it the name of the attribute and the value.
5. Retrieve from the mapping table the physical address that corresponds to this virtual address.
6. Send the packet to the physical address. [This step will trigger Action 4]
7. Done.

Action 9: Load the Emulation Server.
Actor: Emulation Server.
Steps:
1. Load the network scenario
2. Configure the emulated devices.
3. Start the packet listening daemon
4. Start the emulation process.
5. Periodically broadcast in the local subnet the IP address and the port number of the emulation server process. [This step will trigger Action 2, Step 2]

C. Use of UPAs and UDIAs in the Same Networking Systems.

The UPA approach discussed above may be used for virtualization of the networking system software e.g. the protocol stack and the UDIA approach discussed above may be used for virtualization of the networking device. These two techniques, however, may be combined to run in conjunction to virtualize the entire networking subsystem. Users may then launch networking applications that will operate on a virtual networking system provided by a real-time simulation process, e.g. as an emulation. Any operation that is related with the protocol stack will be handled by the UPA, while any operated related to the networking device will be handled by the UDIA. In both cases, the applications will be able to transparently interact with the counterpart virtualized protocol stack and networking device, respectively with UPA and UDIA, within the emulation process.

One benefit of this combined use case is to develop, test and evaluate application for different combinations of networking system software and networking devices. Currently, there exists a large spectrum of networking software and hardware. Executing applications on each possible combination is costly in terms of hardware resources and system administration. With the combined UPA and UDIA approach, the users can conveniently change either the protocol stack using the UPA while keeping the same virtual device, or change the virtual device using UDIA while keeping the same virtual protocol stack, or change both using UPA and UDIA techniques.

Referring now again to FIG. 3 and FIG. 12, a combined UPA and UDIA system and method may be described. The UPA library 303 will bypass the host protocol 306 and connect to the $D_{TARGET}$ interface 1208. The $D_{TARGET}$ interface 1208 will, in turn, use the UDIA 1209 to connect to the emulation process 1207.

Referring now also to FIG. 9. and FIG. 13, a more detailed description of the combined use case is provided. Data interface handler 910 will send packet 913 to UPA socket 914, which will forward the packet to UDIA data interface handler 1209. Similarly, on the return path, UDIA data interface handler 1209 will handoff a received packet to data interface handler 910 in the UPA library 903. Control interface handler 909 will create packet 912 and request UPA socket 914 for transmission. Packet 912 will reach UDIA data interface handler 1209 and subsequently transmitted to emulation process 904.

Application 901 may also use the UDIA interface handler 1210 directly to set, via simulated device $D_{target}$ 1206, and get via simulated network 1207, device attributes and the operation will happen the same way as described above.

In summary, application 901 may use:
(a) the data interface of the socket interface 902 to send and receive data packets which will be handled by UPA library 903 through the data call diverter 906,
(b) the control interface of socket interface 902 to set or get the properties of the protocol stack which will be handled by the control interface diverter 905 in the UPA library 903, and/or
(c) the control interface of the protocol stack 1202 to set or get device attributes which will be handled by UDIA control interface handler 1210.

Figure 17:
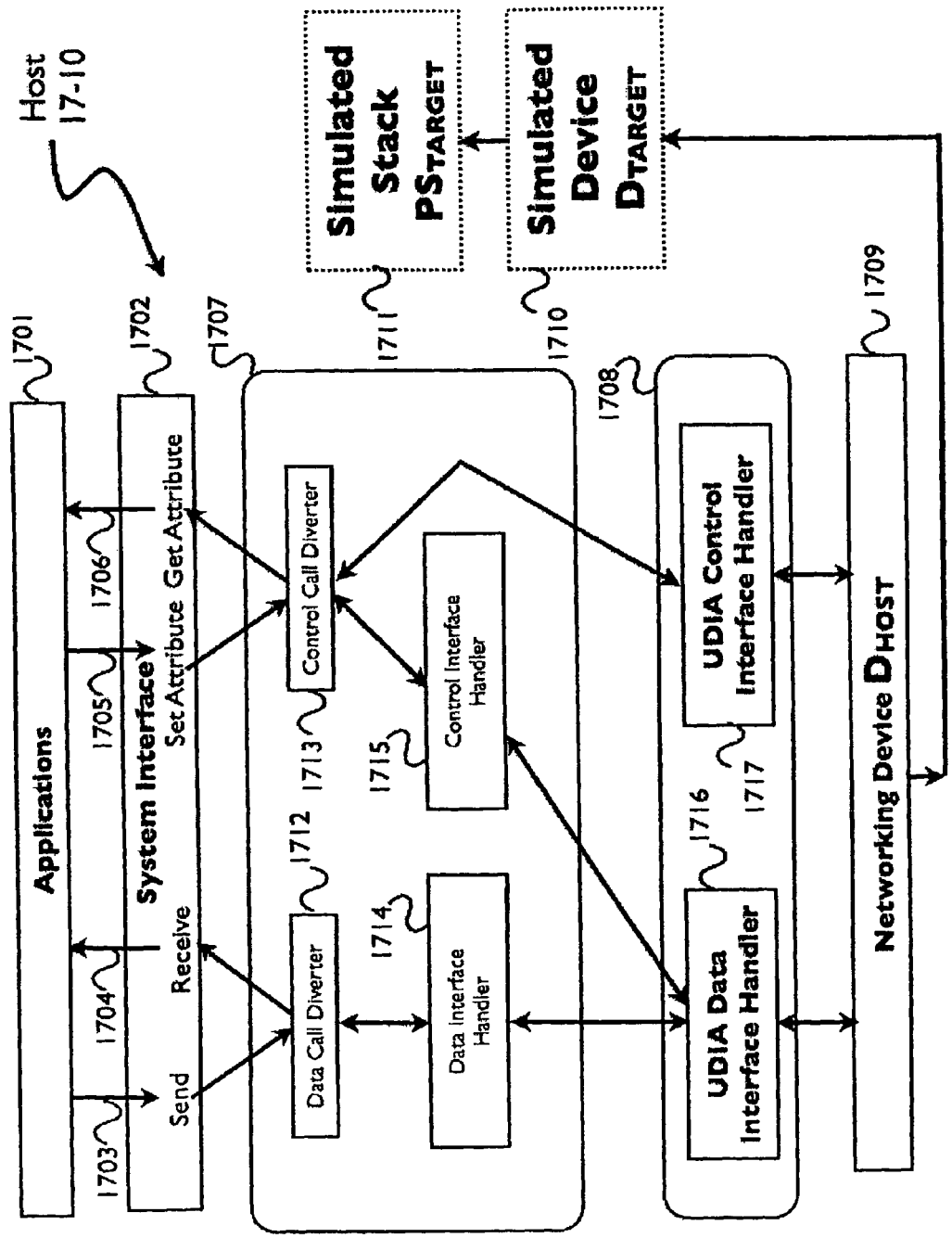
FIG. 17 is a flow chart of a combined UPA and UDIA system.

Referring now to FIG. 17, in a combined operation of UPA and UDIA, host 17-10 may have an application 1701 that may use simulated network device $D_{TARGET}$ 1710 as well as simulated protocol stack $PS_{TARGET}$ 1711. Note that, in contrast to the descriptions in section A and section B above, where only one of $D_{TARGET}$ 1710 or $PS_{TARGET}$ 1711 were simulated, in this case application 1701 may make use of both $D_{TARGET}$ 1710 and $PS_{TARGET}$ 1711 concurrently. Application 1701 may use system interface 1702 to send data 1703, receive data 1704, modify the protocol stack or device attributes 1705 and/or access attributes 1706.

As discussed above, UPA 1707 should be loaded after system interface 1702 but before the host protocol stack (not shown in this figure). FIG. 17 illustrates the usage of UPA 1707 in conjunction with UDIA 1708, indicating how system interfaces 1703 through 1706 are mapped to simulated device $D_{TARGET}$ 1710 and/or simulated protocol stack $PS_{TARGET}$ 1711.

Data call diverter 1712 in UPA 1707 diverts data send 1703 and data receive 1704 calls to data interface handler 1714. Diverter 1712 and handler 1714 may be similar to devices described above with regard to FIGS. 4, 5 and 9. Data interface handler 1714 may communicate with UDIA data interface handler 1716 in UDIA module 1708. UDIA data interface handler 1716, in turn, delivers the calls to the host device $D_{HOST}$ 1709.

Control call diverter 1713 may be responsible for handling set attribute 1705 and get attribute 1706 calls from application 1701. Control call diverter 1713 may determine if the control messages are intended for the protocol stack or the networking device. If the control messages are intended for protocol stack $PS_{TARGET}$ 1711, control call diverter 1713 may pass the message to control interface handler 1715. The details of similar devices to control call diverter 1713 and control interface handler 1715 are described earlier with reference to FIGS. 5, 6 and 9. Control interface handler 1715 will pass the message to UDIA data interface handler 1716. If control messages 1705 or 1706 are intended for simulated device $D_{TARGET}$ 1710, control interface diverter 1713 will pass these messages to UDIA control interface handler 1717. The details of devices similar to both UDIA data interface handler 1716 and control interface handler 1717 are described above with regard to FIGS. 13-16.

Referring now to the right side of the FIG. 17, the real time simulation process may use simulated device $D_{TARGET}$ 1710 and simulated protocol stack 1711. All messages that are received from UDIA data interface handler 1716 may be delivered to the $PS_{TARGET}$ 1711, whereas all messages received from UDIA control interface 1717 may be delivered to the $D_{TARGET}$ 1710. Therefore, in the system and method described in FIG. 17, application 1701 in host 17-10 may send or receive data as well as set or get attributes for both the protocol stack $PS_{TARGET}$ 1711 and device $D_{TARGET}$ 1710 through a combined use of UPA 1707 and UDIA 1708.

The invention claimed is:

1. A method of running a network application on a host computer using an emulated target protocol stack, comprising:
   launching a network application on a host computer, said host computer having a host network protocol stack;
   opening a target protocol stack library on the host computer;
   receiving interface calls from the network application directed to an emulated network device; and
   using the target protocol stack library to divert the interface calls received from the network application to an emulated target protocol stack running on a general purpose computer without resulting in a subsequent interface call to the host network protocol stack or physical hardware accessible therethrough, wherein the emulated target protocol stack includes emulation of software and hardware behaviors of the emulated network device;
   whereby the network application runs on the host computer as if it were running directly on a computer on which the emulated target protocol stack is available.

2. The method of claim 1 wherein using the target protocol stack library to divert the interface calls from the network application further comprises:
   using the target protocol stack library to divert data and control interface calls associated with the network application.

3. The method of claim 1 further comprising:
   launching an additional network application on the host computer;
   opening a second target protocol stack library on the host computer;
   receiving interface calls from the additional network application directed to a second emulated network device; and
   using the second target protocol stack library to divert the interface calls received from the additional network application to a second emulated target protocol stack, wherein the second emulated target protocol stack includes emulation of software and hardware behaviors of the second emulated network device;
   whereby the additional network application also runs on the host computer as if it were running directly on a computer on which the second emulated target protocol stack is available.

4. The method of claim 1 wherein the host computer stack includes
   a host computer network operating system and
   host computer network system hardware, and
   the emulated target protocol stack, which can run on a general purpose computer, includes
   a target computer network operating system and target computer network system hardware,
   wherein at least one of the target computer network operating system or the target computer network system hardware is different than the corresponding host computer network operating system or system hardware.

5. The method of claim 1 further comprising:
   simulating a network environment including wireless communication between a plurality of emulated mobile devices, wherein said emulated network device is one of the emulated mobile devices; and
   applying the network application to the simulated network environment.

6. The method of claim 5 in which simulating a network environment further comprises:
   simulating the network environment including wireless communication between a plurality of mobile devices on a remote computer in network communication with the network application on the host computer.

7. The method of claim 1 wherein network application is not compatible with the host computer protocol stack.

8. The method of claim 1 further comprising:
   opening multiple instances of the target protocol stack library on the host computer; and
   using the multiple instances of the target protocol stack library to divert interface calls associated with the network application to the emulated target protocol stack.

9. The method of claim 1 further comprising:
   opening multiple instances of the target protocol stack library on the host computer; and
   using the multiple instances of the target protocol stack library to divert interface calls associated with the network application to multiple emulated target protocol stacks, each emulating a different network device.

10. The method of claim 1 further comprising:
opening the target protocol stack library on an additional host computer; and
using the target protocol stack library on the additional host computer to divert interface calls associated with the network application to the emulated target protocol stack running on the general purpose computer.

11. The method of claim 1, wherein the general purpose computer is the same as the host computer, further comprising:
emulating the emulated target protocol stack on the host computer.

12. The method of claim 1 further comprising:
emulating the emulated target protocol stack on a computer networked with the host computer.

13. The method of claim 1 further comprising:
emulating a hardware test bed; and
applying the network application to the emulated hardware test bed.

14. The method of claim 1 further comprising:
emulating a first hardware test bed node requiring the emulated target protocol stack;
emulating additional hardware test bed nodes; and
applying the network application in real time to the combined first and additional emulated hardware test bed nodes.

15. The method of claim 1 wherein the network application is in a binary form unmodified from a binary form executable on a computer having only the emulated target protocol stack.

16. The method of claim 1 further comprising:
monitoring operation of the emulated target protocol stack to evaluate operation of the network application.

17. The method of claim 1 further comprising:
monitoring operation of the emulated target protocol stack to evaluate a user's experience when utilizing the network application or interacting with the emulated target protocol stack.

18. The method of claim 1 further comprising:
evaluating operation of the network application during interaction between a human operator and the emulated target protocol stack.

19. The method of claim 1 further comprising:
using an Internet Protocol network communication service in the emulated target protocol stack to provide communication between the network application and other computers communicating by Internet Protocol communication services.

20. The method of claim 1 further comprising:
using the network application to operate emulated hardware networked to the host computer via the emulated target protocol stack.

21. The method of claim 1 wherein the network application on the host computer uses the emulated target protocol stack in an application level proxy operation.

22. The method of claim 1 further comprising:
using a socket application programming interface to simultaneously control system data and system control communications between the network application and the target protocol stack library.

23. The method of claim 1 further comprising:
copying application data to socket buffers to exchange data between the network application and the emulated target protocol stack; and
using function calls to separately communicate control calls from the network application to the emulated target protocol stack.

24. The method of claim 2 wherein using the protocol stack library to divert data and control interface calls associated with the network application to the emulated target protocol stack further comprises:
converting the IP address and port numbers for data and control interface calls between the IP address and port numbers of the host computer and IP address and port numbers of the emulated target protocol stack.

25. The method of claim 1 further comprising:
emulating the emulated target protocol stack on a remote computer networked with the host computer; and
executing an emulation stub on the remote computer for converting packets received from the emulated target protocol stack to a format recognizable by the emulated target protocol stack on a remote computer.

26. The method of claim 1 further comprising:
emulating the emulated target protocol stack on the host computer; and
using a modified socket in the target protocol library for system data and control communication between emulated the target protocol stack and services provided on the host computer.

27. The method of claim 1 further comprising:
opening a system library on the host computer after opening the target protocol stack library on the host computer.

28. The method of claim 3 further comprising:
determining, after opening the second target protocol stack library, whether a system library should be opened on the host computer; and
opening, based on the determining, the host computer's system library.

29. A computer system for running a network application using an emulated target protocol stack, comprising:
a host computer running a network application; and
a target protocol stack library on said host computer, said target protocol stack library configured to divert interface calls received from said network application to an emulated target protocol stack associated with an emulated network device running on a general purpose computer without the network device that is emulated being physically available, wherein the emulated target protocol stack includes emulation of both hardware and software behaviors of the emulated network device;
wherein said network application runs on said host computer as if it were running directly on a computer on which the emulated target protocol stack is available.

30. The system of claim 29, further comprising a simulated network environment including wireless communication between a plurality of emulated mobile devices, wherein the network application is applied to the simulated network environment and wherein said emulated network device is one of the emulated mobile devices.

31. The computer system of claim 29, further comprising:
a second network application running on said host computer;
a second target protocol stack library on said host computer, said second target protocol stack library configured to divert interface calls from said second network application to a second emulated target protocol stack associated with a second emulated network device running on the same or a different general purpose computer without the second network device that is emulated being physically available, wherein the second emulated target protocol stack includes emulation of both hardware and software behaviors of the second emulated network device;

wherein said second network application runs on said host computer as if it were running directly on a computer on which the second emulated target protocol stack is available.

32. The computer system of claim 29:

wherein the host computer includes a host network protocol stack; and wherein the target protocol stack library diverts the interface calls from the network application to the emulated target protocol stack without causing a subsequent interface call to the host network protocol stack or to a physical network device accessible via the host network protocol stack.

33. A method of emulating real-time operation of a network application on a host computer, comprising:

launching a first network application on a host computer, said host computer having an operating system;

launching a second network application on the host computer;

opening a first target protocol stack library on the host computer for the first network application;

opening a second target protocol stack library on the host computer for the second network application;

receiving interface calls from the first application at the first target protocol stack library directed to a software-based emulation of a first network device which emulates software and hardware of the first network device, wherein the software-based emulation of the first network device running on the host computer;

receiving interface calls from the second application at the second target protocol stack library directed to a software-based emulation of a second network device which emulates software and hardware of the second network device, wherein the software-based emulation of the second network device running on the host computer;

using the first target protocol stack library to divert interface calls associated with the first network application to a first emulated target protocol stack represented inside a first emulation process running on a general purpose computer, wherein the first emulated protocol stack emulates behavior of the software and hardware of first network device; and using the second target protocol stack library to divert interface calls associated with the second network application to a second emulated target protocol stack represented inside a second emulation process running on the same or a different general purpose computer, wherein the second emulated protocol stack emulates behavior of the software and hardware of the second network device;

whereby the first and second network applications run on the host computer as if they were running directly on the first or second emulated target protocol stack respectively.

34. The method of claim 33:

wherein the host computer includes a host network protocol stack; and wherein the first and second target protocol stack libraries divert the interface calls associated with the first and second network applications respectively to the first and second emulated target protocol stacks without causing a subsequent interface call to the host network protocol stack or to a physical network device accessible via the host network protocol stack.

35. The method of claim 33, further comprising:

simulating a network environment including wireless communication between a plurality of emulated mobile devices, wherein said first and second emulated network devices are including in the emulated mobile devices; and applying the first and second network applications to the simulated network environment.

36. A method of emulating real-time operation of a network application on a host computer, comprising:

launching a network application on a host computer, said host computer having a host operating system;

launching an interface handler on the host computer;

at the interface handler, receiving interface calls from the network application directed to a software-based emulation process for a network device, said software-based emulation process comprising an emulated target protocol stack emulating both software and hardware behaviors of the network device and running on a general-purpose computer; and diverting the interface calls received from the network application to the software-based emulation process for the network device being emulated such that the interface calls bypass the host operating system;

whereby the network application runs on the host computer as if the network device were physically available.

37. The method of claim 36, further comprising allowing other calls from the network application to be received the host operating system for further processing without being diverted to the software-based emulation process.

38. The method of claim 37, wherein said other calls permit the network application to access a memory, disk space, or graphical user interface associated with the host computer, via the host operating system without using the software-based emulation process.

39. The method of claim 36, wherein the software-based emulation process emulates real-time hardware behavior of the network device being emulated.

* * * * *